(12) United States Patent
Tanaka et al.

(10) Patent No.: US 10,962,776 B2
(45) Date of Patent: Mar. 30, 2021

(54) DISPLAY DEVICE, DISPLAY SYSTEM, MOBILE OBJECT, DISPLAY CONTROL METHOD, AND RECORDING MEDIUM STORING PROGRAM CODE

(71) Applicants: Hiroaki Tanaka, Tokyo (JP); Toshihiro Yamashiro, Kanagawa (JP)

(72) Inventors: Hiroaki Tanaka, Tokyo (JP); Toshihiro Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/779,843

(22) Filed: Feb. 3, 2020

(65) Prior Publication Data

US 2020/0257118 A1 Aug. 13, 2020

(30) Foreign Application Priority Data

Feb. 12, 2019 (JP) .............................. JP2019-022307

(51) Int. Cl.
*G02B 27/01* (2006.01)
(52) U.S. Cl.
CPC ..... *G02B 27/0103* (2013.01); *G02B 27/0149* (2013.01); *G02B 2027/0109* (2013.01); *G02B 2027/0163* (2013.01)
(58) Field of Classification Search
CPC ...... G02B 2027/014; G02B 2027/0138; G02B 2027/0185; G02B 2027/0105; G02B 27/0179; G02B 27/48; G02B 27/095; G02B 27/0101; G02B 27/01; G02B 26/10; G02B 26/101; G02B 19/0052; G02B 21/0032;

(Continued)

(56) References Cited

U.S. PATENT DOCUMENTS

2003/0015652 A1* 1/2003 Kandori ............... G02B 26/101
250/234
2003/0021497 A1* 1/2003 Kandori ............... H04N 9/3129
382/323

(Continued)

FOREIGN PATENT DOCUMENTS

JP 2005-242036 9/2005
JP 2008116678 A 5/2008

(Continued)

OTHER PUBLICATIONS

Extended European Search Report dated Jul. 22, 2020, issued in corresponding European Patent Application No. 20156707.0.

*Primary Examiner* — Dong Hui Liang
(74) *Attorney, Agent, or Firm* — Harness, Dickey & Pierce, P.L.C.

(57) ABSTRACT

A display device includes a light source; a light deflector configured to deflect light emitted from the light source to scan as scanning light in a main scanning direction and a sub-scanning direction; a screen having a scanning area to be two-dimensionally scanned with the scanning light at a predetermined cycle, the scanning area having a first area and a second area that differ in position in the sub-scanning direction; a light receiver disposed on the screen, configured to detect the light scanning in each of the first area and the second area of the screen; and a control unit configured to adjust a position of the scanning light in the scanning area according to the number of scanning lines in each of the first area and the second area.

20 Claims, 25 Drawing Sheets

(58) Field of Classification Search
CPC ......... G06T 19/006; G06T 7/60; G09G 3/002;
G09G 3/025; G09G 3/02; G09G 3/346;
G09G 2340/0464; G09G 2320/0261;
G09G 2320/041
See application file for complete search history.

(56) References Cited

U.S. PATENT DOCUMENTS

| | | | | |
|---|---|---|---|---|
| 2004/0240017 | A1* | 12/2004 | Kandori | G02B 26/0816 |
| | | | | 359/196.1 |
| 2007/0103752 | A1* | 5/2007 | Kandori | G02B 26/101 |
| | | | | 359/196.1 |
| 2012/0098819 | A1* | 4/2012 | Furuya | G02B 5/32 |
| | | | | 345/212 |
| 2015/0022898 | A1* | 1/2015 | Yamakawa | G02B 27/0149 |
| | | | | 359/633 |
| 2017/0154558 | A1 | 6/2017 | Atsuumi et al. | |
| 2018/0013992 | A1* | 1/2018 | Hayashi | G02B 27/0101 |
| 2018/0070062 | A1* | 3/2018 | Shitomi | H04N 9/3129 |
| 2018/0172984 | A1* | 6/2018 | Kimura | H04N 9/3135 |
| 2018/0240387 | A1 | 8/2018 | Atsuumi et al. | |
| 2019/0285886 | A1* | 9/2019 | Yamashiro | G03G 15/04072 |
| 2019/0310462 | A1* | 10/2019 | Yoshimura | G02B 26/10 |
| 2020/0033452 | A1* | 1/2020 | Takagawa | G01S 7/4972 |

FOREIGN PATENT DOCUMENTS

| | | |
|---|---|---|
| JP | 2009-180753 | 8/2009 |
| JP | 2010-079198 | 4/2010 |
| JP | 2015-031782 | 2/2015 |
| JP | 2018-005078 | 1/2018 |

* cited by examiner

FIG. 5
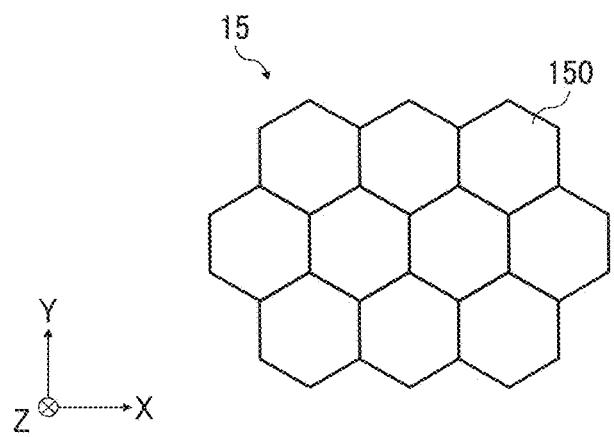
FIG. 6A
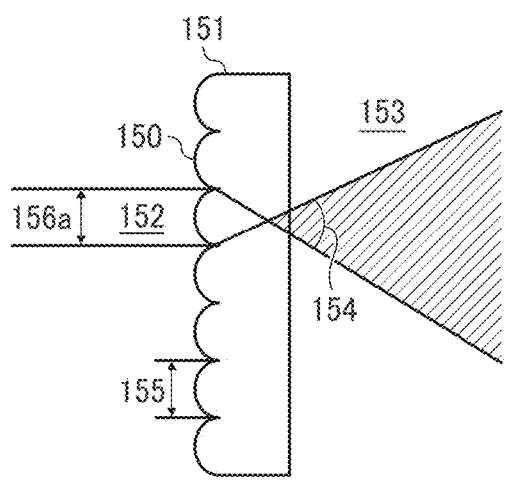
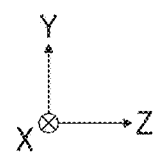
FIG. 6B
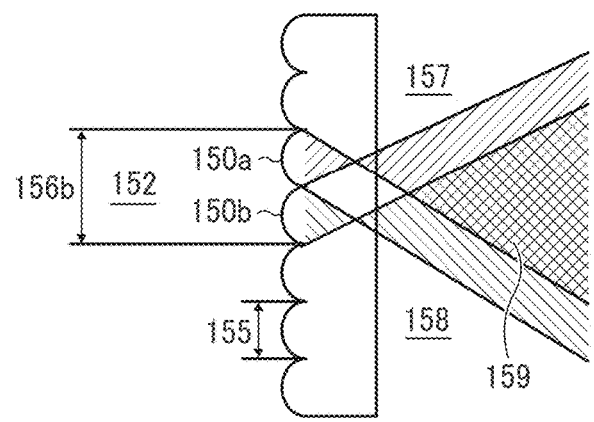
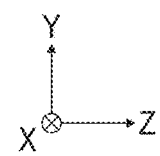

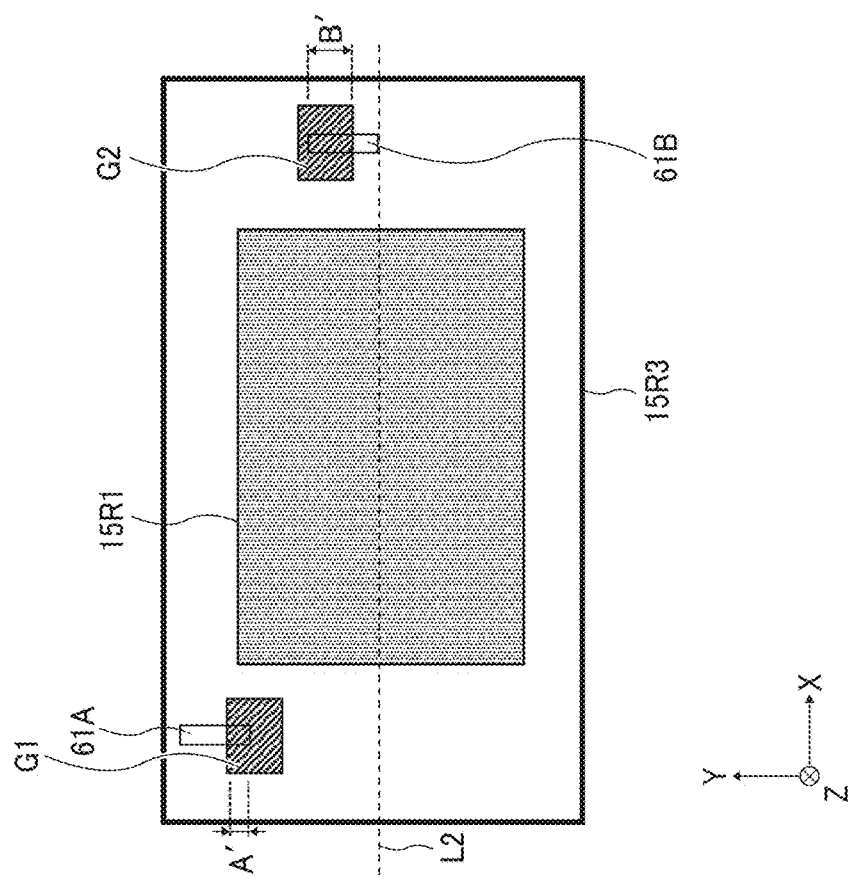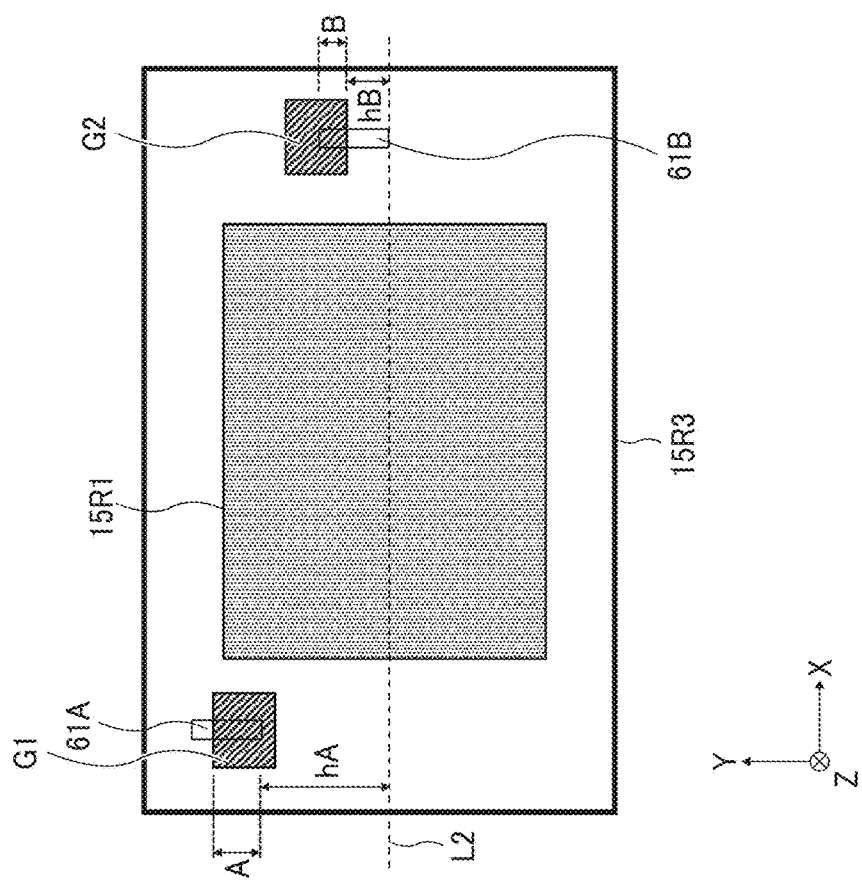

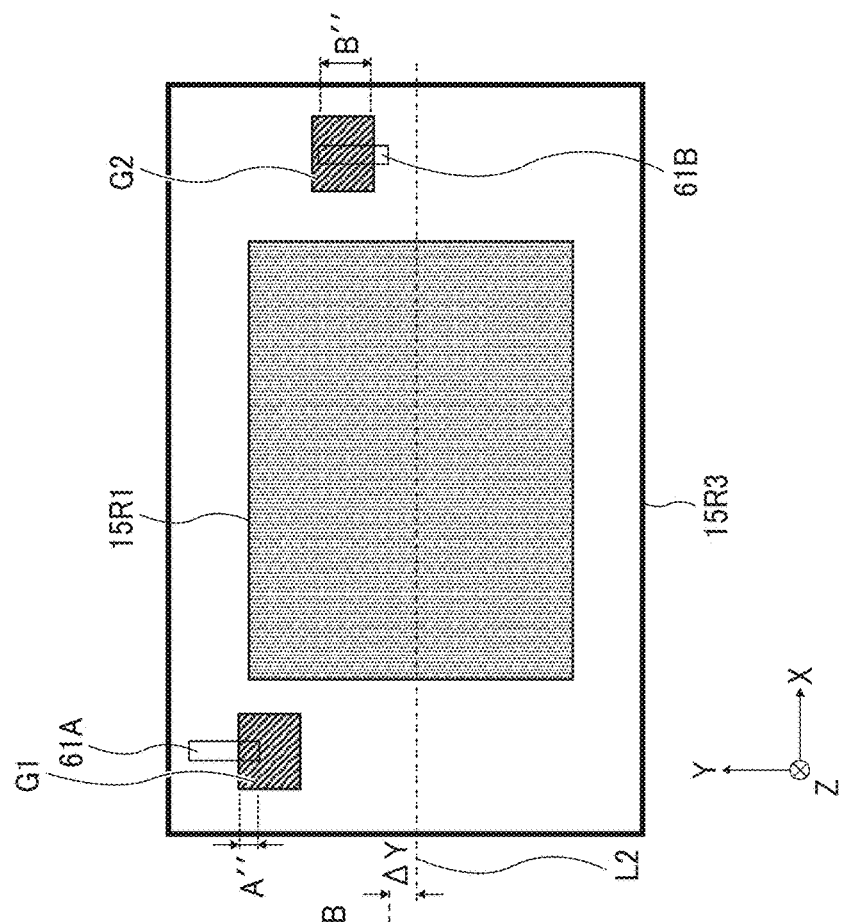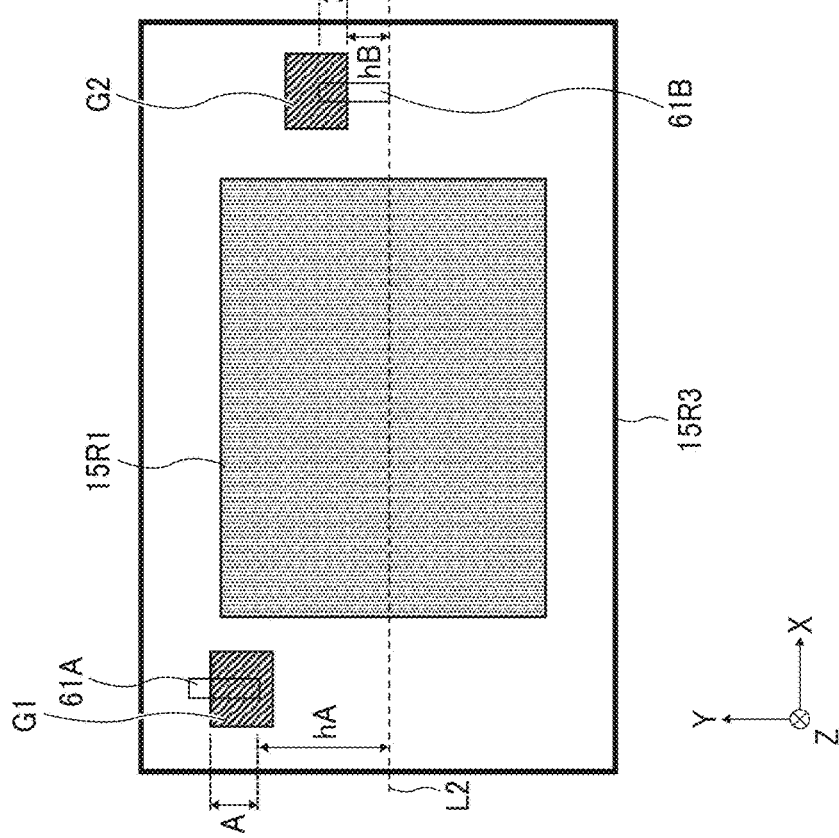

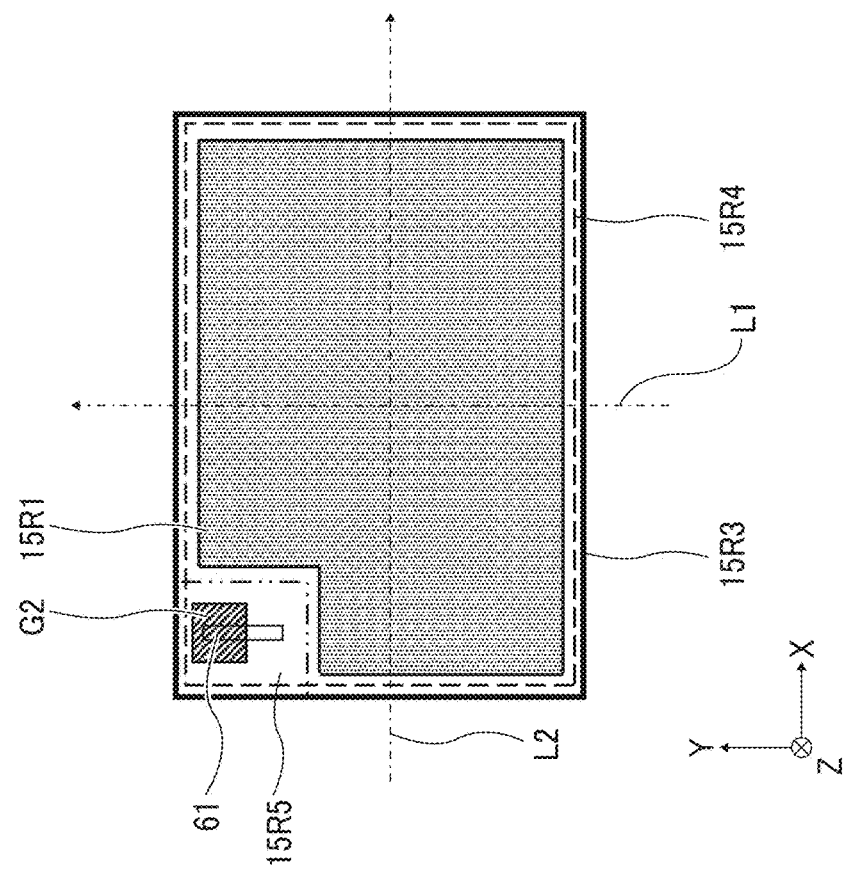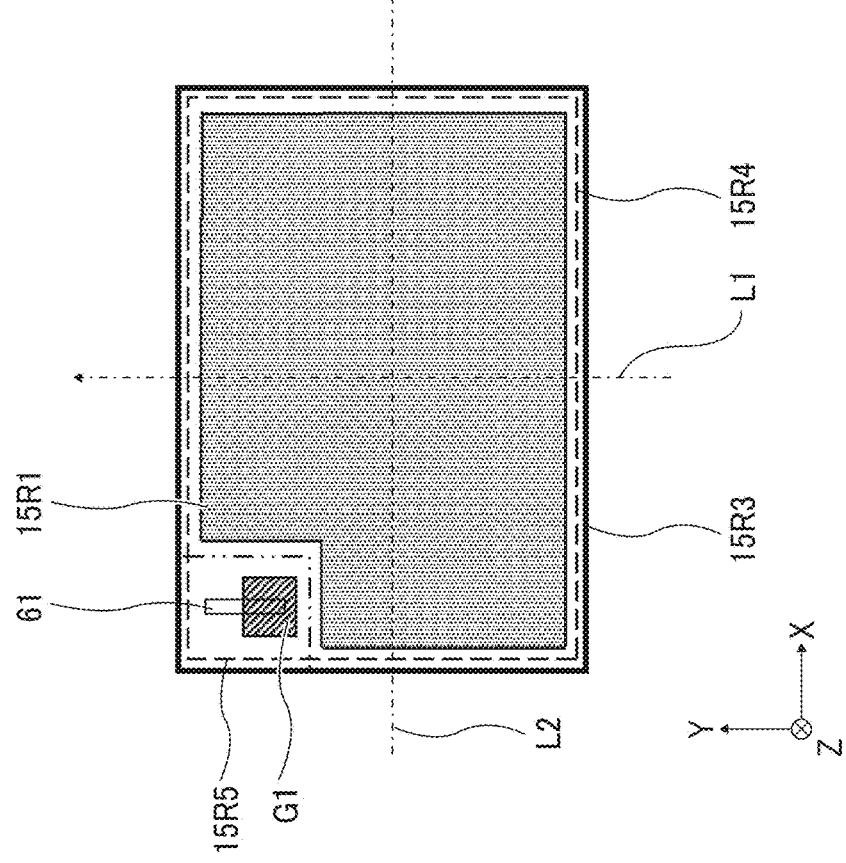

|  | (a) | (b) | (c) |
|---|---|---|---|
| A: MAXIMUM MAIN SCANNING WIDTH | 1X | 1X | 1X |
| B: MINIMUM MAIN SCANNING WIDTH | 1X | 1X | 1.3X |
| C: MAXIMUM SUB-SCANNING WIDTH | 1X | 1X | 1X |
| D: MINIMUM SUB-SCANNING WIDTH | 1X | 1.5X | 1.5X |

DISPLAY DEVICE, DISPLAY SYSTEM, MOBILE OBJECT, DISPLAY CONTROL METHOD, AND RECORDING MEDIUM STORING PROGRAM CODE

CROSS-REFERENCE TO RELATED APPLICATION

This patent application is based on and claims priority pursuant to 35 U.S.C. § 119(a) to Japanese Patent Application No. 2019-022307, filed on Feb. 12, 2019, in the Japan Patent Office, the entire disclosure of which is hereby incorporated by reference herein.

BACKGROUND

Technical Field

Embodiments of the present disclosure relate to a display device, a display system, a mobile object, a display control method, and a recording medium storing program code.

Description of the Related Art

In the related art, two-dimensional scanning devices are known that includes an oscillating mirror used to scan the light flux emitted from a light source in the first and second directions and form a two-dimensional scanning area.

SUMMARY

A display device includes a light source; a light deflector configured to deflect light emitted from the light source to scan as scanning light in a main scanning direction and a sub-scanning direction; a screen having a scanning area to be two-dimensionally scanned with the scanning light at a predetermined cycle, the scanning area having a first area and a second area that differ in position in the sub-scanning direction; a light receiver disposed on the screen, configured to detect the light scanning in each of the first area and the second area of the screen; and circuitry configured to adjust a position of the scanning light in the scanning area according to the number of scanning lines in each of the first area and the second area, the scanning lines being a trajectory of the scanning light detected by the light receiver in the main scanning direction.

A display control method includes deflecting light emitted from the light source to scan as scanning light in a main scanning direction and a sub-scanning direction; detecting the light scanning each of a first area and a second area of a screen to be scanned with the scanning light, the scanning area having a first area and a second area that contains positions different in the sub-scanning direction; detecting the number of scanning lines in each of the first area and the second area, which are a trajectory of the scanning light detected by the light receiver in the main scanning direction; and adjusting a position of the scanning light in the scanning area in the sub-scanning direction according to the number of scanning lines detected in the detecting.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is an illustration of an example of a specific configuration of a screen according to the first embodiment;

FIGS. 6A and 6B are illustrations for describing the differences in action caused by the differences of the diameter of incident light flux and the lens diameter in a microlens array;

FIGS. 16A and 16B are illustrations for describing a correction of an image size;

FIGS. 17A and 17B are illustrations for describing a correction of an image position;

FIGS. 28A and 28B are illustrations of a configuration for correcting an image according to still another embodiment;

Figure 1:
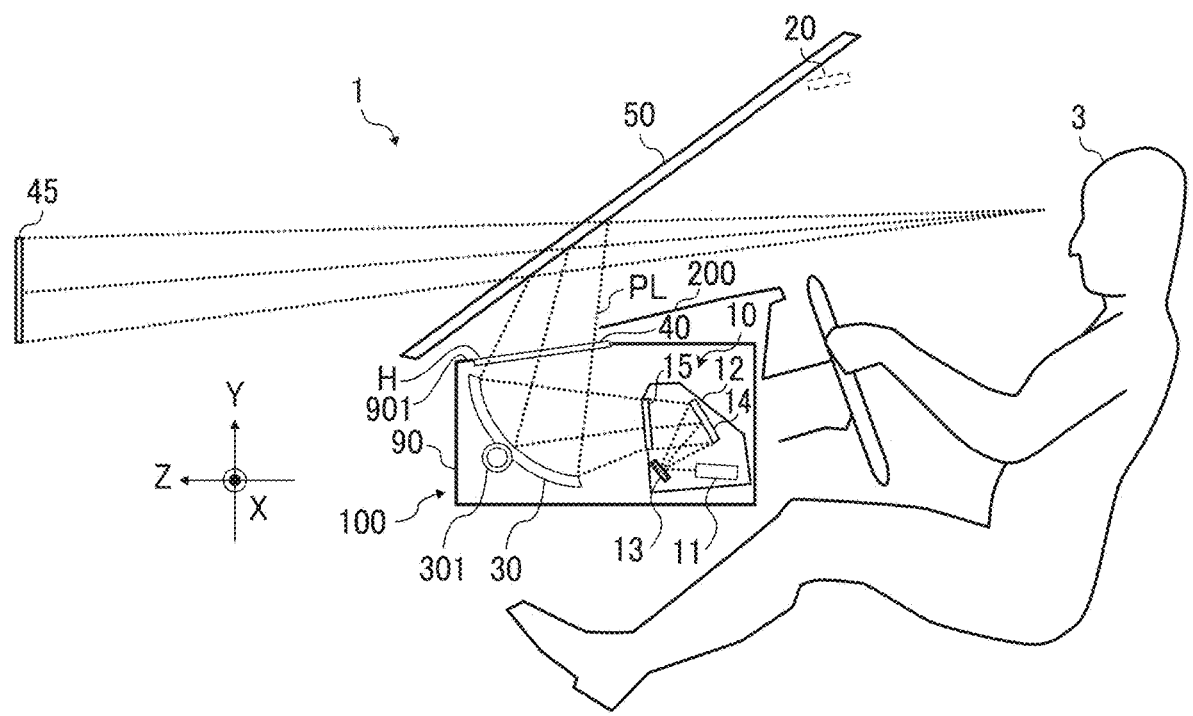
FIG. 1 is an illustration of an example configuration of a display system according to a first embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described with reference to the drawings. In the description of the drawings, the same elements are denoted by the same reference numerals, and redundant description is omitted.

FIG. 1 is an illustration of an example of the configuration of a display system 1 according to the first embodiment of the present disclosure. In the display system 1, the viewer 3 can visually identify a display image as the projection light PL that is projected from a display device 100 is projected onto a transmissive reflector. The display image is an image that is superimposed and displayed as a virtual image 45 on the field of view of the viewer 3. For example, the display system 1 is provided for a mobile object such as a vehicle, an aircraft, and a ship, or an immobile object such as a maneuvering simulation system, and a home-theater system. In the present embodiment, cases in which the display system 1 is provided on a vehicle as an example of a mobile object is described. However, no limitation is intended thereby, and the type of usage of the display system 1 is not limited to the present embodiment.

For example, the display system 1 is mounted in a vehicle, and makes navigation information visible to the viewer 3 (i.e., the driver) through a front windshield 50 of the vehicle. The navigation information includes, for example, the information about the speed of the vehicle, the course information, the distance to a destination, the name of the current place, the presence or position of an object ahead of the vehicle, a traffic sign indicating, for example, speed limit, and traffic congestion, and aids the driving of the vehicle. In such cases, the windshield 50 serves as a transmissive reflector that transmits a portion of the incident light and reflects at least some of the remaining incident light. The distance between the location of the eyepoint of the viewer 3 and the windshield 50 is about several tens of centimeters (cm) to one meter (m).

The display system 1 includes the display device 100, an extraneous light sensor 20, and a front windshield 50. For example, the display device 100 is a heads-up display (HUD) provided for a vehicle as an example of the mobile object. The display device 100 may be arranged at any desired position in conformity with the interior design of the vehicle. For example, the display device 100 according to the present embodiment may be disposed under a dashboard 200 of the vehicle or built into the dashboard of the vehicle.

Moreover, the display device 100 includes an image forming unit 10, a free-form surface mirror 30, and a housing 90. The image forming unit 10 includes a light-source device 11, a unit housing 12, a light deflector 13, a mirror 14, and a screen 15. The extraneous light sensor 20 is a sensing device that is disposed to detect, for example, the illuminance as the intensity of extraneous light of the display system 1. As illustrated in FIG. 1, for example, the extraneous light sensor 20 is arranged near the front windshield 50.

The light-source device 11 that is an example of a light source is a device that emits the laser beams emitted from a light source to an area outside the device. For example, the light-source device 11 may emit laser beams in which three-color laser beams of red, green, and blue (RGB) are combined. The laser beams that are emitted from the light-source device 11 are guided to the reflection plane of the light deflector 13. For example, the light-source device 11 has a semiconductor light-emitting element such as a laser diode (LD) that serves as a light source. However, no limitation is intended thereby, and the light source may be a semiconductor light-emitting element such as a light-emitting diode (LED).

The light deflector 13 uses, for example, a micro-electromechanical systems (MEMS) to change the directions of travel of the laser beams. For example, the light deflector 13 is configured by a scanner such as a mirror system composed of one minute MEMS mirror that pivots around two axes orthogonal to each other or two MEMS mirrors that pivot or rotates around one axis. The laser beams that are emitted from the light deflector 13 scans the mirror 14. The light deflector 13 is not limited to a MEMS mirror, but may be configured by a polygon mirror or the like.

For example, the mirror 14 is a concave mirror, and reflects the laser beams, which are deflected by the light deflector 13 and scan the reflection plane of the mirror 14, towards the screen 15.

A two-dimensional intermediate image (image light) is formed on the screen 15, which serves as an image forming unit, as the laser beams reflected by the reflection plane of the mirror 14 scan the surface of the screen 15. Note also that the screen 15 serves as a divergent part through which the scanned laser beams diverge at a predetermined divergence angle. For example, the screen 15 may consist of an exit pupil expander (EPE), and may be configured by a transmissive optical element such as a microlens array (MLA) or diffuser panel that diffuses light. Alternatively, the screen 15 may be configured by a reflective optical element such as a micromirror array that diffuses light.

The light-source device 11, the light deflector 13, the mirror 14, and the screen 15 are stored in the unit housing 12, and serve as a part of the image forming unit 10. The screen 15 is not covered by the unit housing 12 in its entirety such that the diverging light diverging through the screen 15 can be emitted outside the image forming unit 10, but is partially held by the unit housing 12. The unit housing 12 may be a single unit of three-dimensional object, or may be configured by a combination of a plurality of members. As an example configuration or structure in which a combination of a plurality of members are combined, the unit housing 12 may be configured by a combination of a plurality of members including the light-source device 11, the light deflector 13, the mirror 14, a three-dimensional object that covers the optical path in its entirety, and a holder or the like that holds the screen 15.

The virtual image 45 is a magnified view of the intermediate image that is formed on the screen 15, and such a virtual image is achieved as the laser beams (light flux) that are the light diverging through the screen 15 are projected onto the free-form surface mirror 30 and the front windshield 50. The free-form surface mirror 30 is designed and arranged so as to cancel, for example, the inclination of the image, the distortion of the image, and the displacements of the image, which are caused by the bent shape of the windshield 50. The free-form surface mirror 30 may be arranged in a pivotable manner around a rotation axis 301. For example, the rotation axis 301 passes through the center of gravity of the free-form surface mirror 30, and the free-form surface mirror 30 is rotated on a straight line parallel to the direction orthogonal to the sheet of FIG. 1 to change the position at which the virtual image 45 is displayed in the up-and-down directions on the sheet of FIG. 1. Due to such a configuration, the free-form surface mirror 30 can adjust the reflection direction of the laser beams (light flux) emitted from the screen 15 to change the position at which the virtual image 45 is displayed according to the positions of the eyes of the viewer (driver) 3.

The free-form surface mirror 30, which is an example of an imaging optical system, reflects the diverging light to project the projection light PL in order to form a virtual image with the light diverging through the screen 15. Due to this configuration, the free-form surface mirror 30 is designed using, for example, a commercially available optical design simulation software, such that the free-form surface mirror 30 has a certain level of light-gathering power to achieve a desired image-forming position of the virtual image 45. In the display device 100, the light-gathering power of the free-form surface mirror 30 is designed such that the virtual image 45 is displayed at a position away from the location of the eyepoint of the viewer 3 in the depth direction by, for example, at least 1 m and equal to or shorter than 30 m (preferably, equal to or shorter than 10 m).

The imaging optical system is satisfactory as long as it includes at least one light-concentrating element that has a light-concentrating function. Such a light-concentrating element that has a light-concentrating function is not limited to a free-form surface mirror like the free-form surface mirror 30, and may be, for example, a concave mirror, a curved-surface mirror, and a Fresnel reflector element. For example, such a light-concentrating element is formed by performing sputtering or vapor deposition on a thin metal film such as of aluminum (Al) and silver (Ag) with high reflectivity. Due to such a configuration, the utilization efficiency of the light incident on a light-concentrating element as the projection light PL can be maximized, and a virtual image with high brightness can be obtained.

The projection light PL that is reflected by the free-form surface mirror 30 is projected outside the display device 100 from a slit formed on the housing 90, and is incident on the front windshield 50. As illustrated in FIG. 1, a hole H is formed on the housing 90 by a hole surrounding area 901. The hole surrounding area 901 is a part of the housing 90 around the hole H. The position and size of the hole H is determined depending on the size of the hole surrounding area 901 and the position at which the hole surrounding area 901 is arranged. In order to prevent a foreign substance from entering the housing 90 through the hole H, a dustproof window 40 is arranged so as to close the hole H. In particular, it is desired that the dustproof window 40 be made of a material through which the projection light PL can pass through.

The front windshield 50 is an example of a reflector, and serves as a transmissive reflector that transmits some of the laser beams (bundle of laser beams) and reflects at least some of the remaining laser beams (partial reflection). The windshield 50 may serve as a semitransparent mirror through which the viewer 3 visually recognizes the virtual image 45 and the scenery ahead of the mobile object (vehicle). The virtual image 45 is an image to be displayed that is visually recognized by the viewer 3, including vehicle-related information (e.g., speed and travel distance), navigation information (e.g., route guidance and traffic information), and warning information (e.g., collision warning). For example, the transmissive reflector may be another windshield arranged in addition to the windshield 50.

The virtual image 45 may be displayed so as to be superimposed on the scenery ahead of the front windshield 50. The windshield 50 is not flat but is curved. For this reason, the position at which the virtual image 45 is formed is determined by the curved surface of the free-form surface mirror 30 and the windshield 50. In some embodiments, the windshield 50 may be a semitransparent mirror (combiner) that serves as a separate transmissive reflector having a partial reflection function.

The plane of the free-form surface mirror 30 is designed and shaped so as to reduce the optical distortion that occurs on the front windshield 50. The light beams that are incident on the free-form surface mirror 30 are reflected by the free-form surface mirror 30 according to the shape of the plane of the free-form surface mirror 30. The reflected bundles of laser beams (light flux) are then incident on the front windshield 50, and reach at least one eyepoint within an eye-lip area including at least the eye-lip center (i.e., the reference eyepoint). The bundles of laser beams that are incident on the front windshield 50 are reflected according to the shape of the surface of the front windshield 50.

Due to such a configuration as above, the laser beams (light flux) that are emitted from the screen 15 are projected towards the free-form surface mirror 30. The projection light that is concentrated by the free-form surface mirror 30 passes through the hole H of the housing 90 and is projected towards the front windshield 50, and is reflected by the front windshield 50. Accordingly, the viewer 3 can visually recognize the virtual image 45, i.e., the magnified image of the intermediate image formed on the screen 15, due to the light reflected by the windshield 50.

A method of projecting an image using the display device 100 may be implemented by a panel system or a laser scanning system. In the panel system, an intermediate image is formed by an imaging device such as a liquid crystal panel, a digital micromirror device (DMD) panel (digital mirror device panel), or a vacuum fluorescent display (VFD). In the laser scanning system, an intermediate image is formed by scanning the laser beams emitted from the light-source device 11, using an optical scanner.

The display device 100 according to the first embodiment of the present disclosure adopts the laser scanning system. In particular, in the laser scanning system, since emitting/non-emitting can be assigned to each pixel, in general, a high-contrast image can be formed. In some alternative embodiments, the panel system may be adopted as the projection system in the display device 100.

Figure 2:
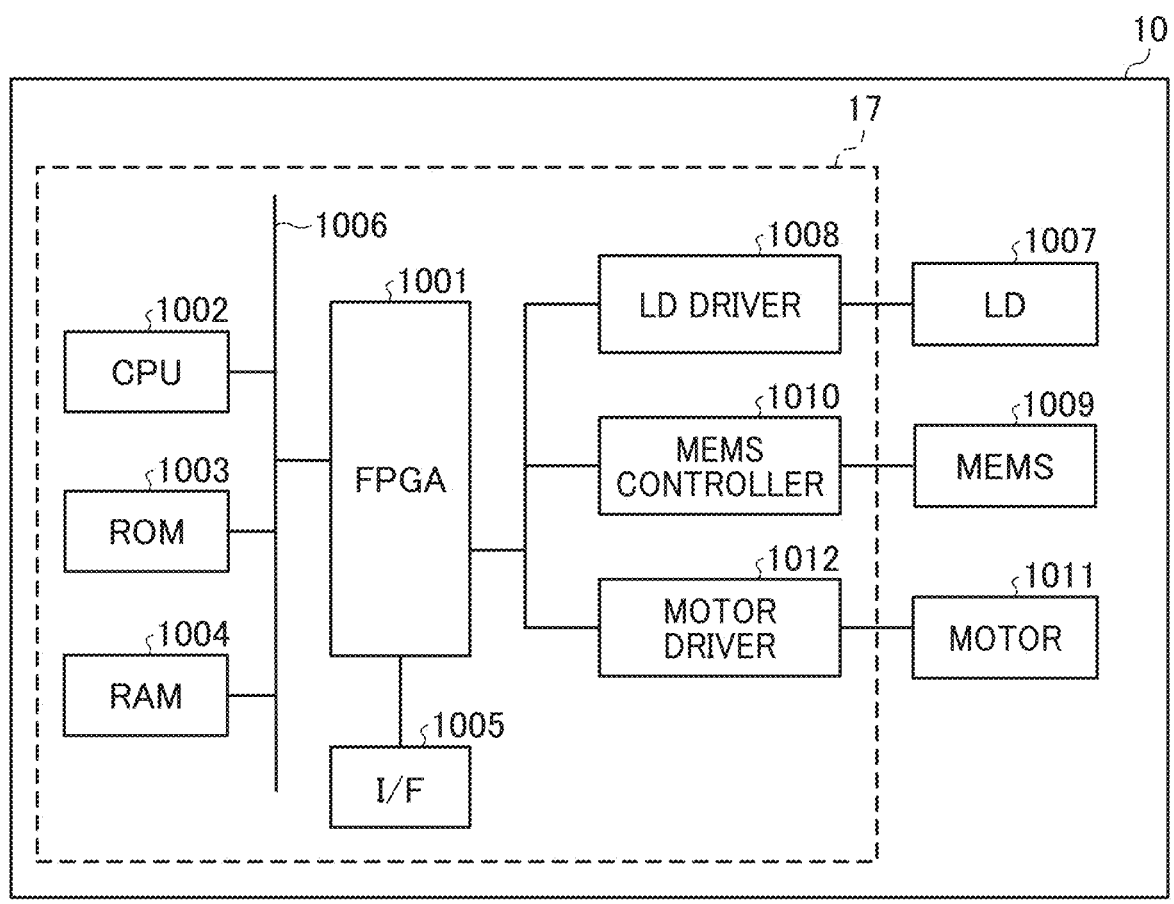
FIG. 2 is a block diagram of an example hardware configuration of a display device according to the first embodiment of the present disclosure.

FIG. 2 is a block diagram of a hardware configuration of the display device according to the first embodiment. The hardware configuration illustrated in FIG. 2 may be adopted in common among the embodiments of the present disclosure. Alternatively, some components or elements may be added to or deleted from the hardware configuration of FIG. 2.

The display device 100 includes a controller 17 that controls the operation of the display device 100. For example, the controller 17 is a circuit board or integrated circuit (IC) chip mounted inside the display device 100. The controller 17 includes a field-programmable gate array (FPGA) 1001, a central processing unit (CPU) 1002, a read only memory (ROM) 1003, a random access memory (RAM) 1004, an interface (I/F) 1005, a data bus line 1006, a laser diode (LD) driver 1008, a micro-electromechanical systems (MEMS) controller 1010, and a motor driver 1012. The controller 17 is an example of a control unit.

The FPGA 1001 is an integrated circuit whose setting can be changed by a designer of the display device 100. The LD driver 1008, the MEMS controller 1010, and the motor driver 1012 generate a drive signal according to the control signal output from the FPGA 1001. The CPU 1002 is an integrated circuit that controls the entirety of the display device 100. The ROM 1003 is a storage device that stores a computer executable program for controlling the CPU 1002. The RAM 1004 is a storage device that serves as a work area of the CPU 1002.

The interface 1005 communicates with an external device. For example, the interface 1005 is coupled to the controller area network (CAN) of a vehicle. Moreover, the interface 1005 is coupled to, for example, the extraneous light sensor 20. The extraneous light sensor 20 sends the sensing data (i.e., the intensity of the extraneous light) to the controller 17 through the interface 1005. Note also that the sensor that is coupled to the interface 1005 is not limited to the extraneous light sensor 20, and other various kinds of sensors for acquiring the internal and external information of the vehicle may be coupled to the interface 1005.

The LD driver 1008 is a circuit that generates a drive signal for driving the light-source device 11. For example, the LD driver 1008 generates a drive signal for a semiconductor light-emitting element LD that configures a part of the light-source device 11. The MEMS controller 1010 is a circuit that generates a drive signal for driving the light deflector 13. For example, the MEMS controller 1010 generates a drive signal for driving the MEMS that is a device for moving a scanning mirror that configures a part of the light deflector 13. The motor driver 1012 is a circuit that generates a drive signal for driving various kinds of motors. For example, the motor driver 1012 generates a drive signal for driving the motor 1011 that rotates the rotation axis 301 of the free-form surface mirror 30.

Figure 3:
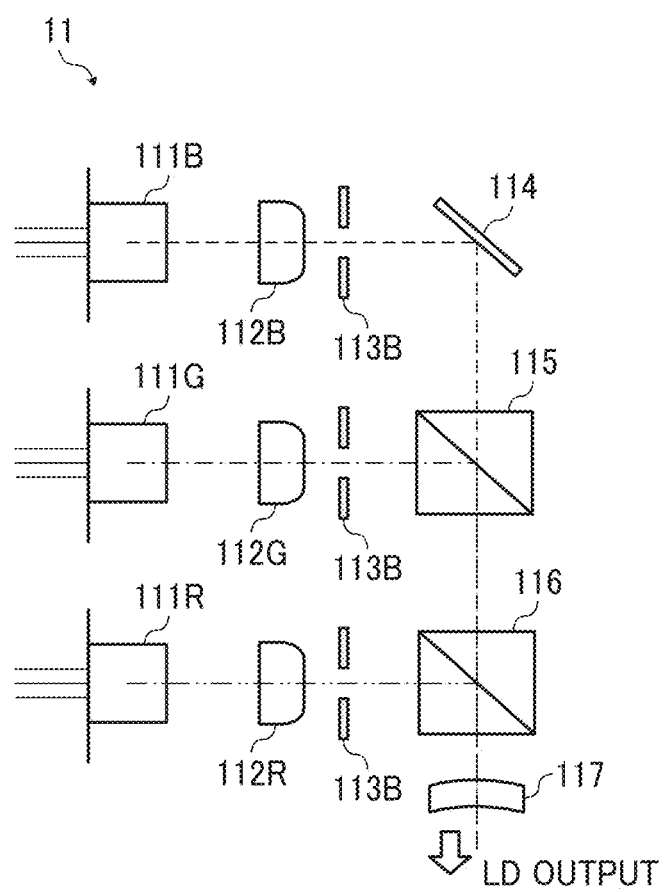
FIG. 3 is a diagram illustrating a specific configuration of a light source according to the first embodiment of the present disclosure.

FIG. 3 is a diagram illustrating a specific configuration of the light-source device 11 according to the first embodiment of the present disclosure. The light-source device 11 includes light-source elements 111R, 111G, and 111B (these light-source elements may be referred to simply as a light-source element 111 in the following description when it is not necessary to distinguish each of the light-source elements), coupling lenses 112R, 112G, and 112B, apertures 113R, 113G, and 113B, combiners 114, 115, and 116, an optical branching element 117, a lens, and a photodetector.

For example, each of the light source elements 111 R, 111 G, and 111B of three colors (R, G, B) of three colors (red, green, and blue (RGB)) is a laser diode (LD) having a single or a plurality of light-emitting points. Each of the light-source elements 111R, 111G, and 111B emits laser beams whose light intensity depends on the amount of changes in the drive current that is supplied to each of the light-source elements. The light-source elements 111R, 111G, and 111B emit bundles of laser beams (light flux) having different wavelengths λR, λG, and λB, respectively. For example, λR=640 nanometers (nm), λG=530 nm, and λB=445 nm.

The emitted bundles of laser beams (light flux) are coupled by the coupling lenses 112R, 112G, and 112B, respectively. The coupled bundles of laser beams (light flux) are shaped by the apertures 113R, 113G, and 113B, respectively. The shape of the apertures 113R, 113G, and 113B may be various kinds of shape such as a circle, an ellipse, a rectangle, and a square depending on, for example, certain predetermined conditions such as the divergence angle of the bundles of laser beams (light flux).

The laser beams (light flux) that are shaped by the apertures 113R, 113G, and 113B are combined by the three combiners 114, 115, and 116, respectively. The combiners 114, 115, and 116 are plate-like or prismatic dichroic mirrors, and reflect or transmit the laser beams (light flux) therethrough according to the wavelength of the laser beams to combine the laser beams into one bundle of laser beams (light flux) that travels along one optical path. Then, the combined light flux enters the optical branching element 117.

Some of the light that has entered the optical branching element 117 passes through the optical branching element 117, and different some of the light that has entered the optical branching element 117 is reflected by the optical branching element 117. In other words, the combined laser beams (light flux) are branched into transmitted light and reflected light by the optical branching element 117.

The transmitted light passes through the lens, and the light deflector 13 is irradiated with the transmitted light. As a result, the transmitted light is used to draw an image or display a virtual image on the screen 15. In other words, the transmitted light is used as light for projecting an image.

On the other hand, the photodetector is irradiated with the reflected light. The photodetector outputs an electrical signal according to the light intensity of the received laser beams. For example, the output electrical signal is output to the FPGA 1001, and may be used to control the display system 1. As described above, according to the present embodiment, the reflected light is used as monitoring light that adjusts the intensity of the laser beams or monitoring light that adjusts the color or brightness of the resultant virtual image.

Figure 4:
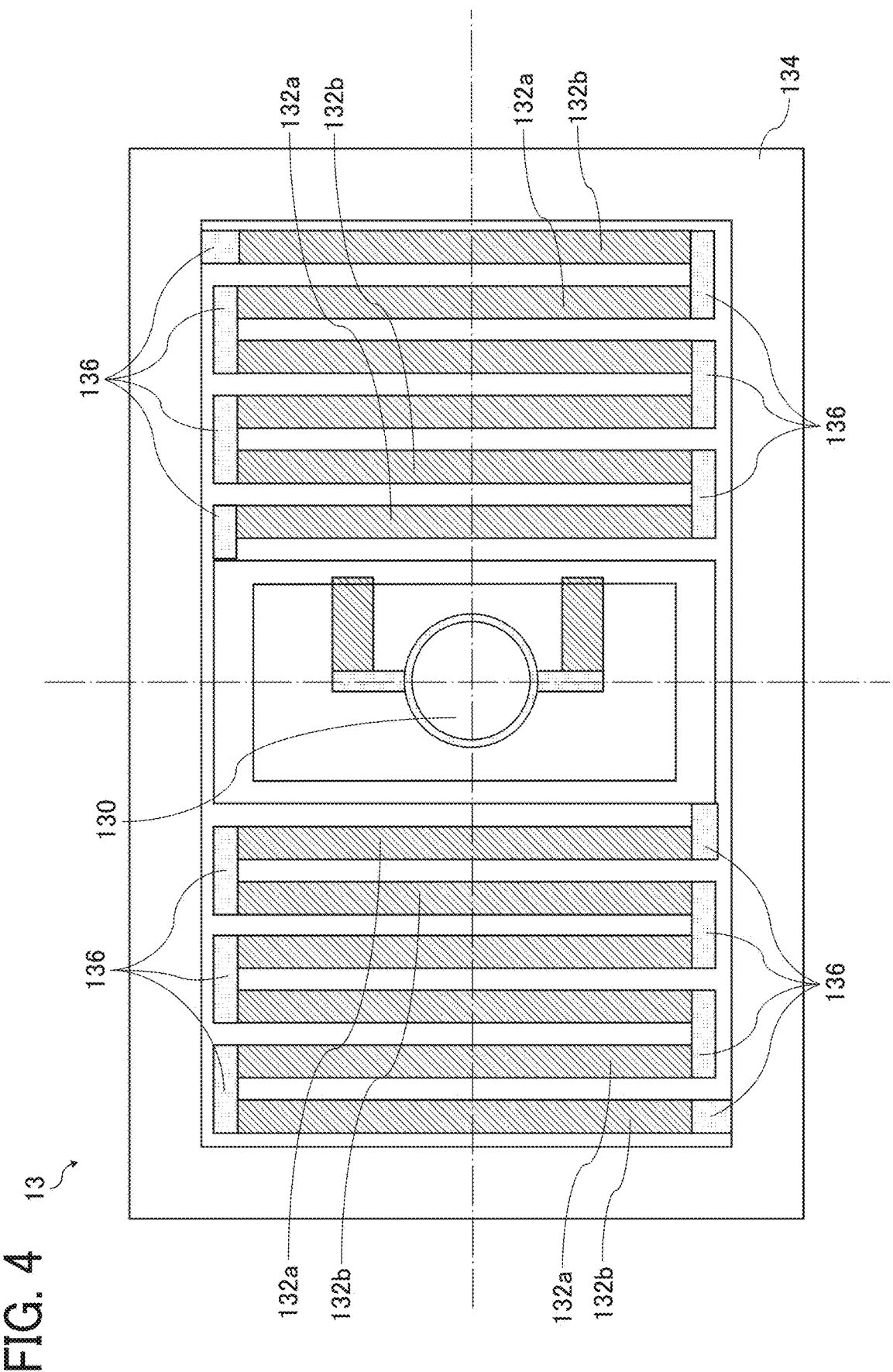
FIG. 4 is an illustration of a specific configuration of a light source according to the first embodiment of the present disclosure.

FIG. 4 is a diagram illustrating a specific configuration of the light deflector 13 according to the first embodiment of the present disclosure. The light deflector 13 is a MEMS mirror produced by semiconductor processing, and includes a mirror 130, a serpentine beam 132, a frame 134, and a piezoelectric member 136. The light deflector 13 is an example of a light deflector.

The mirror 130 has a reflection plane that reflects the laser beams emitted from the light-source device 11 towards the screen 15 side. In the light deflector 13, a pair of serpentine beams 132 are formed across the mirror 130. Each of the pair of serpentine beams 132 has a plurality of turning portions. Each of these turning portions is configured by a first beam 132a and a second beam 132b that are arranged alternately. Each of the pair of serpentine beams 132 is supported by the frame 134. The piezoelectric member 136 is disposed such that the first beam 132a and the second beam 132b, which are adjacent to each other, are coupled to each other. The piezoelectric member 136 applies different levels of voltage to the first beam 132a and the second beam 132b to bend each of the first beam 132a and the second beam 132b differently.

As a result, the first beam 132a and the second beam 132b, which are adjacent to each other, bend in different directions. As the bending force is accumulated, the mirror 130 rotates in the vertical direction around the horizontal axis. Due to such a configuration as above, the light deflector 13 can perform optical scanning in the vertical direction at a low voltage. An optical scanning in the horizontal direction around the axis in the vertical direction is implemented by the resonance produced by a torsion bar or the like coupled to the mirror 130.

FIG. 5 is an illustration of an example of a specific configuration of a screen according to the first embodiment. The screen 15 forms an image of the laser light emitted from the LD 1007 that forms a part of the light-source device 11. The screen 15 serves as a divergent part that diverges the laser beams at a predetermined divergence angle. The screen 15 as illustrated in FIG. 5 has a microlens-array structure in which a plurality of hexagonal-shaped microlenses 150 are arranged with no gap therebetween. For example, the width of each of the microlenses 150 (the distance between two sides that face each other) is optimized to a ranged from 50 micrometers (μm) to 300 μm. In the present embodiment, the width of each of the microlenses 150 is approximately 200 μm. As the microlenses 150 of the screen 15 have a hexagonal shape, the multiple microlenses 150 can be arrayed with high density.

Note that the shape of each microlens 150 is not limited to the hexagon shape. Thus, alternatively, in some embodiments, each microlens 150 has, for example, a rectangular shape, or a triangle shape. In the present embodiment, structure in which the multiple microlenses 150 are arrayed in a regularized manner is described. However, no limitation is intended thereby, and the arrangement of the microlenses 150 is not limited to this structure. For example, the centers of the multiple microlenses 150 may be decentered from each other, and the microlenses 150 may be arranged in an irregular manner. When adopting such an eccentric arrangement, each microlens 150 has a different shape.

Alternatively, the height of the vertex in the optical-axis direction may be changed. When the decentering in the direction in which microlenses are arrayed or the shifting in the optical-axis direction is determined on a random basis, for example, the speckles that are caused by the interference of the laser beams that have passed through the boundary between each pair of neighboring microlenses and the moire that is caused by the cyclic array can be reduced.

The laser beams that have reached the screen 15 scan the inside of the microlenses 150, and multiple dots are marked as the laser beams are switched on and off during the scanning. For example, the levels of gradation can be expressed by a combination of on-off control of light. Alternatively, the levels of gradation may be expressed by adjusting the radiation intensity of the laser beams.

FIGS. 6A and 6B are illustrations for describing a difference in action due to the difference in incident-light-beam diameter and lens diameter in a microlens array. As illustrated in FIG. 6A, the screen 15 is configured by an optical plate 151 in which the multiple microlenses 150 are neatly arranged. When an incident light 152 is scanned on the optical plate 151, the incident light 152 diverges as passing through the microlenses 150, and the incident light 152 becomes a diverging light 153. Due to the structure of the microlenses 150, the screen 15 can diverge the incident light 152 at a desired divergence angle 154. The intervals 155 at which the microlenses 150 are arranged is designed to be wider than the diameter 156a of the incident light 152. Accordingly, the screen 15 does not cause interference among the lenses, and does not cause speckles (speckle noise).

FIG. 6B is a diagram illustrating the optical paths of diverging light beams when the diameter 156b of the incident light 152 is twice wider than the intervals 155 at which the microlenses 150 are arranged. The incident light 152 is incident on two microlenses 150a and 150b, and these two microlenses 150a and 150b produce two diverging light beams 157 and 158, respectively. In such cases, a light interference might occur because two diverging light beams exist in an area 159. Such an interference between two diverging light beams (coherent light) is visually recognized as a speckle by a viewer.

In view of the above circumstances, the intervals 155 at which the microlenses 150 are arranged is designed to be wider than the diameter 156 of the incident light 152 in order to reduce the speckles. A configuration with convex lenses is described above with reference to FIGS. 6A and 6B. However, no limitation is indicated thereby, and advantageous effects can be expected in a similar manner in a configuration with concave lenses.

As described above with reference to FIG. 5, FIG. 6A, and FIG. 6B, the screen 15 that is an example of an image forming unit serves as a divergent part through which the scanned laser beams diverge at a predetermined divergence angle. Due to this functionality, the driver (viewer) 3 can recognize an image in the range of the eye box. Thus, even when the driver (viewer) 3 who is seated on the driver's seat changes the positions of his/her eyes to some extent, his/her visually-recognizable range can be secured.

As described above, it is desired that the shape of each one of the microlenses 150 has a certain level of precision such that the light appropriately diverges through the screen 15 provided with the microlenses 150. Further, preferably, the screen 15 can be mass-produced. For this reason, for example, the screen 15 is molded by resin material. A concrete example of resin that satisfies the reflection property or optical property required for the microlenses 150 may include methacrylic resin, polyolefin resin, polycarbonate, and cyclic polyolefin resin. However, no limitation is intended thereby.

Figure 7:
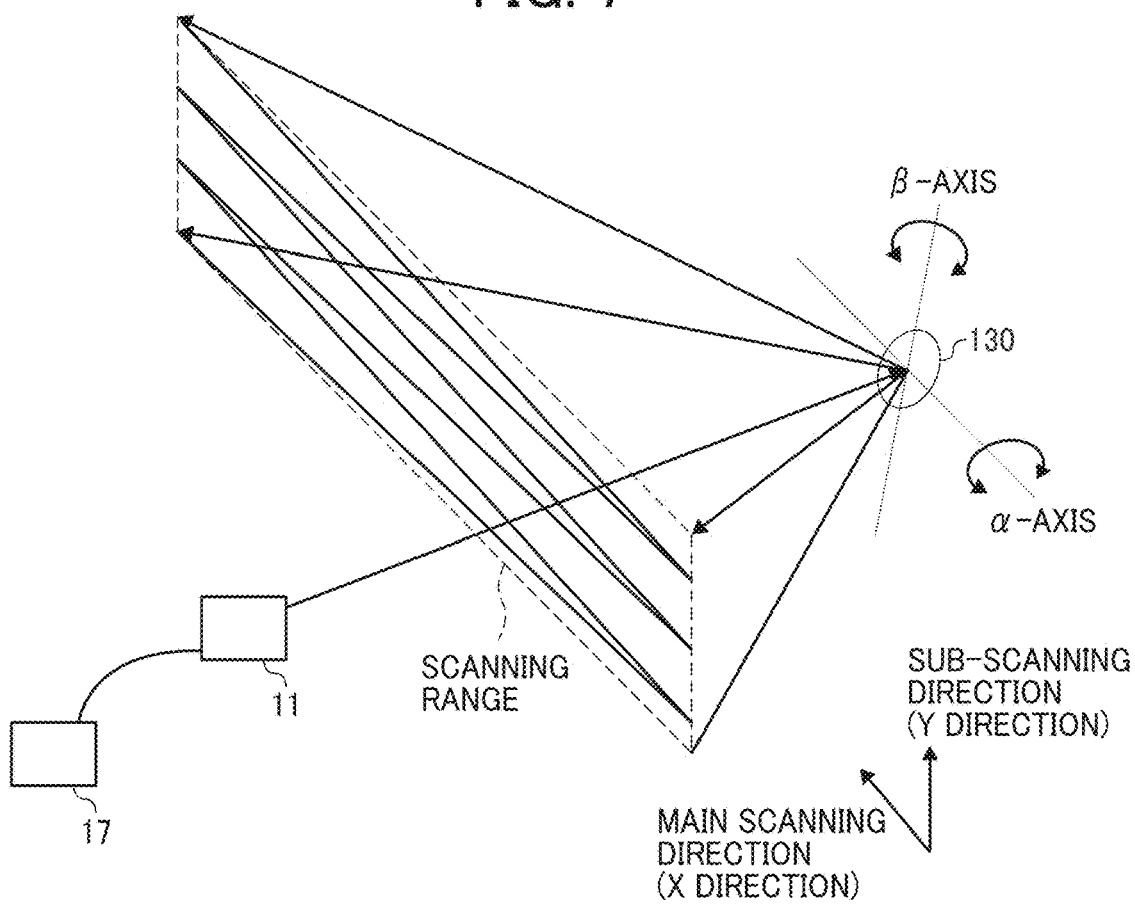
FIG. 7 is an illustration for describing the relation of a mirror and a scanning range of the light deflector.

FIG. 7 is an illustration for describing the relation of a mirror and a scanning range of the light deflector. The FPGA 1001 of the controller 17 controls the light-emission intensity, the timing of light emission, and the light waveform of the multiple light-source elements in the light-source device 11. The LD driver 1008 drives the multiple light-source elements of the light-source device 11 to emit laser beams. As illustrated in FIG. 7, the laser beams that are emitted from the multiple light-source elements and whose optical paths are combined are two-dimensionally deflected about the α axis and the β axis by the mirror 130 of the light deflector 13, and the screen 15 is irradiated with the laser beams deflected by the mirror 130, which serve as scanning beams. In other words, the screen 15 is two-dimensionally scanned by main scanning and sub-scanning by the light deflector 13.

As described with reference to FIG. 1, in the present embodiment, the mirror 14 is provided on the optical path between the light deflector 13 and the screen 15. That is, the scanning light from the light deflector 13 two-dimensionally scans the mirror 14 and the reflected light from the mirror 14 scans the two-dimensionally on the screen 15 as the scanning light.

In the present embodiment, the entire area to be scanned by the light deflector 13 may be referred to as a scanning range. The scanning beams scan (two-way scans) the scanning range of the screen 15 in an oscillating manner in the main scanning direction (X-axis direction) at a high frequency of about 20,000 to 40,000 hertz (Hz) while one-way scanning the scanning range of the screen 15 in the sub-scanning direction (Y-axis direction) by a predetermined amount. The scanning in the sub-scanning direction is performed at a frequency of about a few tens of Hz, which is lower than the frequency in the main scanning direction. In other words, the light deflector 13 performs raster scanning on the screen 15. In this configuration, the display device 100 controls the light emission of the multiple light-source elements according to the scanning position (the position of the scanning beam). Accordingly, an image can be drawn on a pixel-by-pixel basis and a virtual image can be displayed.

As described above, a two-dimensional scanning area is formed on the plane including the surface of the screen 15 every time raster scanning is performed one time. In other words, a two-dimensional scanning area is formed on the plane including the surface of the screen 15 for every sub-scanning cycle that is a predetermined cycle. The scanning area that is formed every time raster scanning is performed one time may be referred to as a scanning frame. As described above, the sub-scanning frequency is about a few tens of hertz (Hz). Accordingly, the length of time it takes for a scanning area to be formed on the screen 15 every sub-scanning cycle, i.e., the length of time to scan one scanning frame (one cycle of two-dimensional scanning), is a few tens of millisecond (msec). For example, assuming that the main-scanning cycle and the sub-scanning cycle are 20,000 Hz and 50 Hz, respectively, the length of time to scan one frame in one cycle of two-dimensional scanning is 20 msec with reference to the sub-scanning frequency.

Figure 8:
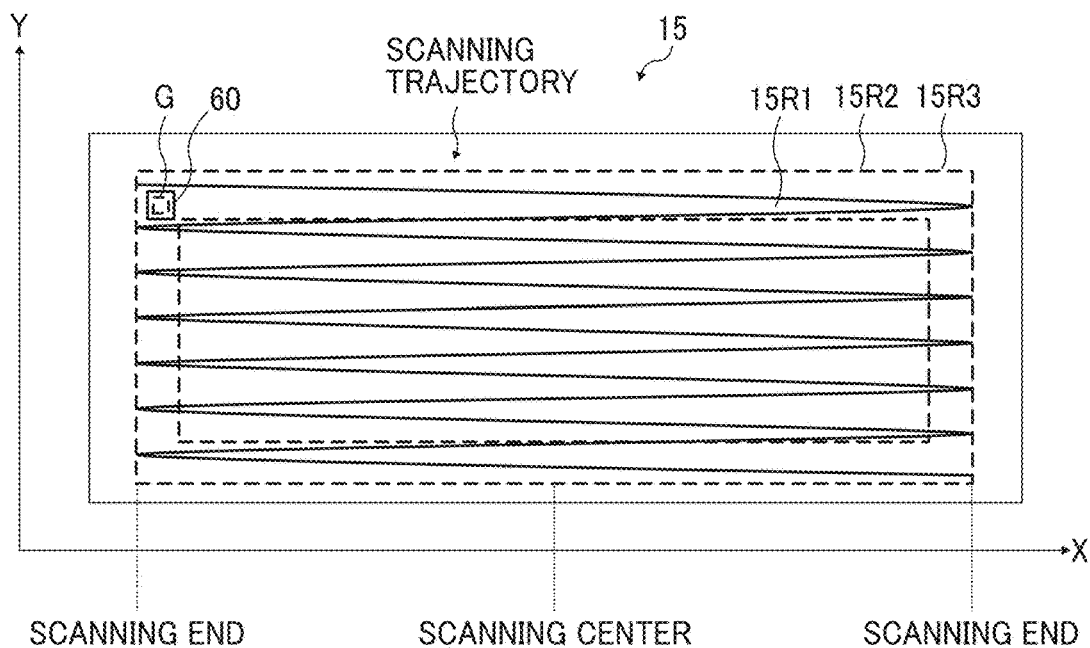
FIG. 8 is an illustration of an example of a trajectory of a scanning line when two-dimensional scanning is performed, according to an embodiment of the present disclosure.

FIG. 8 is an illustration of an example of a trajectory of a scanning line when two-dimensional scanning is performed, according to an embodiment of the present disclosure. As illustrated in FIG. 8, the screen 15 includes a display image area 15R1 and a non-image area 15R2. The display image area 15R1 is irradiated with the light that is modulated according to the image information, and an intermediate image is drawn on the display image area 15R1. The non-image area 15R2 is a frame-shaped area that surrounds the display image area 15R1.

The scanning area 15R3 is a combined range of the display image area 15R1 and the non-image area 15R2 on the screen 15. In FIG. 8, the track of the scanning in the scanning range and a plurality of main scanning lines, which is a linear track of scanning in the main scanning direction, are drawn in the sub-scanning direction, and form a zigzag line. For the sake of explanatory convenience, the number of main-scanning lines in FIG. 8 is less than the actual number of main-scanning lines. In FIG. 8, the track of the scanning is a zigzag line where the ends of the main scanning lines are contiguous to each other. However, no limitation is intended therein. In other words, the main scanning lines may be parallel to each other, and the ends of the main scanning lines may be not continuous. The main scanning lines may be formed by the two-way scanning as illustrated in FIG. 8, or may be formed by repeated one-way scanning.

Further, the screen 15 includes a detection image field G that includes a light receiver disposed at the edges of the display image area 15R1 (a part of the non-image area 15R2) in the scanning range. In FIG. 8, the detection image area G is disposed on the −X and +Y side of the display image area 15R1. More specifically, the detection image area G is disposed at a corner on the +Y side. The light detection sensor 60 is disposed at a position where the scanning light incident on the detection image area G is detected. When the scanning light is detected by the light detection sensor 60, the light detection sensor 60 outputs a light signal to the FPGA 1001. The light detection sensor 60 has a light receiver, such as a photodiode, and is fixed and disposed on a part of the screen 15 or a part of the unit housing 12, for example. The FPGA 1001 detects the operation of the light deflector 13 based on the timing at which the signal is received. Accordingly, the start timing of scanning or the end timing of scanning can be determined.

In other words, the track of scanning line where a plurality of main scanning lines are drawn in the sub-scanning direction, which is linear track of scanning in the main scanning direction, is formed in the scanning range. In the display image area 15R1 of the scanning range, a display image to be presented to a user is formed by the track of scanning line where a plurality of main scanning lines, which are linear track of scanning in the main scanning direction, are drawn in the sub-scanning direction. For example, the display image is a still image (frame) that makes up the input moving images (video data). In the following description, the area within the display image area 15R1 in a scanning frame may be referred to as a scanning-frame image.

All the cycles in which a scanning frame and a scanning-frame image are formed corresponds to the sub-scanning cycle. A scanning-frame image is sequentially formed based on the image data for every sub-scanning cycle, and the virtual image 45 is drawn. Due to such a configuration, the viewer 3 who observes the virtual image 45 that is sequentially displayed can visually recognize the virtual image 45 as moving images.

As described above, the screen 15 is configured by a transmissive optical element such as the microlens array that diffuses light. However, no limitation is intended therein. In some embodiments, the screen 15 may be a reflective element such as a micromirror array that diffuses light, depending on the design or layout of the display device 100. Alternatively, in some embodiments, the screen 15 may be a flat plate or curved plate that does not diffuse light.

In the embodiments of the present disclosure as described above, the formation of the scanning area 15R3 is described on condition that the scanning light that is emitted from the light deflector 13 scans the plane that includes a surface of the screen 15. No limitation is intended thereby. For example, when a mirror 14 is disposed on the optical path between the light deflector 13 and the screen 15, the scanning area 15R3 is formed on the mirror 14. Further, when another type of reflecting mirror is disposed on the optical path between the light deflector 13 and the screen 15, the scanning area 15R3 is formed also on the reflecting mirror or the plane that is scanned by the scanning light reflected by the reflecting mirror.

At least, the display image area 15R1 is formed on the screen 15 in the end, but it is not necessary for all the scanning area 15R3 to reach the plane that includes the surface of the screen 15. For example, the detection image area G may be designed to be detected by the light detection sensor 60 provided before reaching the plane including the screen 15. Alternatively, the optical path may be changed before reaching the plane including the screen 15, and the detection image area G is detected by the light detection sensor 60 disposed in the changed optical path.

The shape of the screen 15 and the shape of the display image area 15R1 are not limited to the shape as illustrated in FIG. 8. The display image area 15R1 does not need to be a flat rectangular shape as illustrated in FIG. 8. The display image area 15R1 may have a curved surface. Alternatively, the display image area 15R1 may have a rectangular or polygonal shape different from the rectangular shape of the screen 15.

For example, the shape of the display image area 15R1 may be determined by the shape of a portion (i.e., a holder or the like) of the unit housing 12 that holds the screen 15. In other words, when the screen 15 is held by the unit housing 12 or a holder of the screen 15, which is a part of the unit housing 12, so as to cover the non-image area 15R2, the light incident on the held portion is blocked by the unit housing 12 and the free-form surface mirror 30 is not irradiated with the light. Accordingly, the free-form surface mirror 30 is irradiated with the diverging light from the intermediate image of the display image area 15R1. As described above, the virtual image 45 of a desired shape is formed by determining the shape of the display image area 15R1.

Figure 9A:
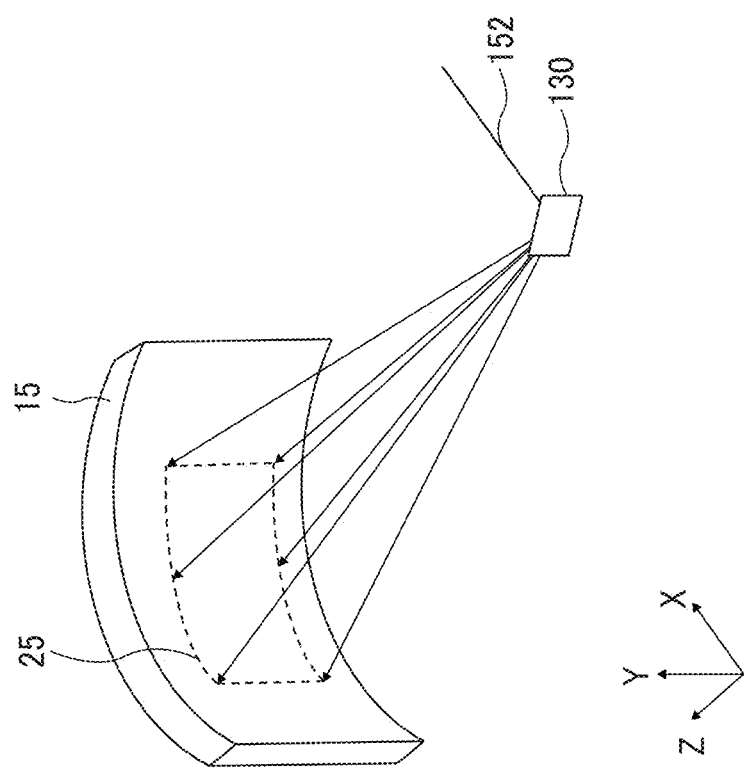
FIGS. 9A and 9B are illustrations for describing the shapes of screens.
Figure 9B:
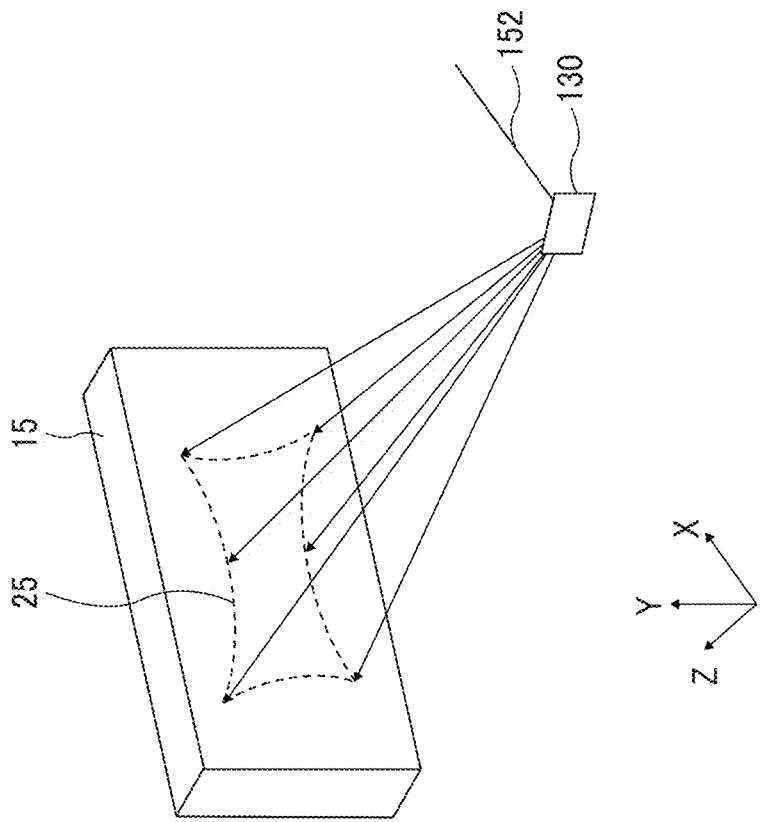

FIGS. 9A and 9B are illustrations for describing the shapes of the screen 15. The following describes the effect of the difference in the distance between the arrival positions of the light deflector 13 and the screen 15 due to the shape of the screen 15 on the image, with reference to FIGS. 9A and 9B.

FIG. 9A is an illustration of the case in which the screen 15 is flat. FIG. 9B is an illustration of the case in which the screen 15 is curved. More specifically, the screen 15 in FIG. 9B has a concave surface facing the mirror 130.

In the case of the flat-screen in FIG. 9A, the intermediate image 25 is distorted due to the difference in the distance between the arrival positions of the light deflector 13 and the screen 15. In addition, the beam spot diameter varies depending on the arrival position. When such light beams are formed as the virtual image 45 through the observation optical system constituted by the free-form surface mirror 30, the windshield 50, and the like, the image quality might decrease. An optical element for correcting such distortion of images and variation in spot diameter might be disposed between the light deflector 13 and the to-be-scanned surface 22, but this leads to an increase in HUD size and cost.

By contrast, curving the screen 15 as illustrated in FIG. 9B can reduce the difference in the above-described distance. Accordingly, the distortion of the intermediate image 25 and the variation of the beam spot diameter can be reduced as compared with the case of the flat screen. Thus, the image quality of the virtual image 45 can be improved without increasing the size of the HUD or increasing the cost.

As described with reference to FIG. 1, in the present embodiment, the mirror 14 is provided on the optical path between the light deflector 13 and the screen 15. That is, the scanning light from the light deflector 13 two-dimensionally scans the mirror 14 and the reflected light from the mirror 14 scans the two-dimensionally on the screen 15 as the scanning light.

The configuration of the light detection sensor 60 will be described with reference to FIGS. 10A, 10B, and 10C. The light detection sensor 60 includes a light receiver 61 and a signal line 62. The light receiver 61 is, for example, a photodiode that converts an optical signal into an electric signal. When the laser beam scans the light receiving surface of the light receiver 61, a pulse signal waveform is obtained.

Figure 10A:
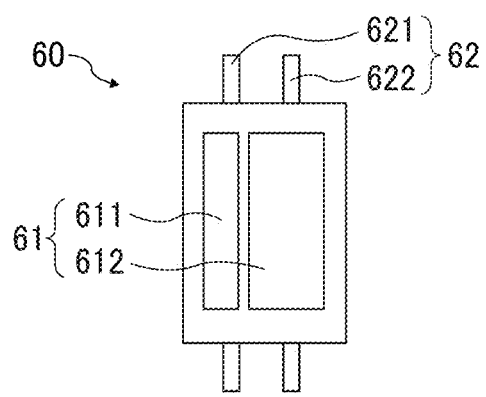
FIGS. 10A, 10B, and 10C are illustrations for describing a light receiver.

FIG. 10A is an illustration of the configuration of the light detection sensor 60. As described above, the light detection sensor 60 includes a light receiver 61 and a signal line 62. The light receiver 61 is, for example, a photodiode that converts an optical signal into an electric signal. The light receiver 61 has two divided surfaces to receive light, which are light-receiving surfaces 611 and 612. The light-receiving surface 611 has a smaller width in the main scanning direction than the light-receiving surface 612 does. The signal line 62 has a signal line 621 for outputting a signal from the light-receiving surface 611 and a signal line 622 for outputting a signal from the light-receiving surface 612.

Figure 10B:
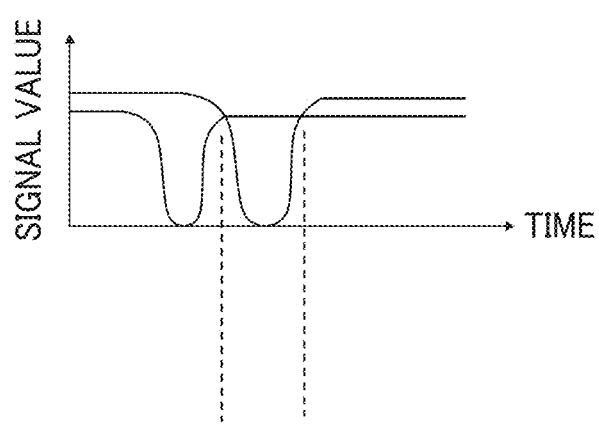

FIG. 10B is a graph of a signal output when scanning laser light moves in a direction from the light-receiving surface 611 to the light-receiving surface 612. More specifically, FIG. 10B indicates two types of signals output from the light-receiving surface s 611 and 612 when the scanning is performed in a direction from the light-receiving surface 611 to the light-receiving surface 612 having a larger width in the scanning direction. As illustrated in FIG. 10B, when the scanning of the laser beam is performed, a pulse signal having a width corresponding to the time it takes for the laser light to pass through each light-receiving surface. Thus, the timing at which light has passed through the light-receiving surface can be detected using the pulse signal.

Figure 10C:
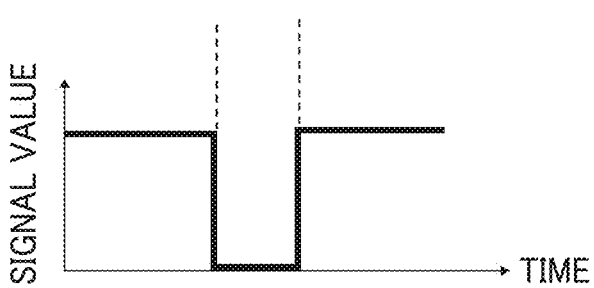

FIG. 10C is an illustration of a pulse signal waveform obtained based on the intersecting timing of the two signals in FIG. 10B. More specifically, a signal as illustrated in FIG. 10C is output based on the intersecting timing so as to obtain a pulse signal waveform when the laser light scans on the photodiode.

The absolute value of an output signal value of the pulse signal changes with the amount of light incident on one photodiode varies. Accordingly, the timing at which the light passes through the light-receiving surface might be shifted at the time of detection even if the light receiver is scanned at the same timing. In view of such a situation, when the fluctuation of the amount of incident light is significant, the intersecting timing of the two signals as illustrated in FIG. 10C is used so as to achieve high-accuracy detection.

In the above-described embodiment, the case where the light detection sensor provided with two divided light-receiving surfaces is used is described. However, no limitation is intended thereby. In some examples, the light-receiving surface may not be divided. In this case, as illustrated in FIG. 10B, the point in time at which the output signal value exceeds a predetermined threshold value is detected as the timing at which light has passed through the light-receiving surface.

Figure 11:
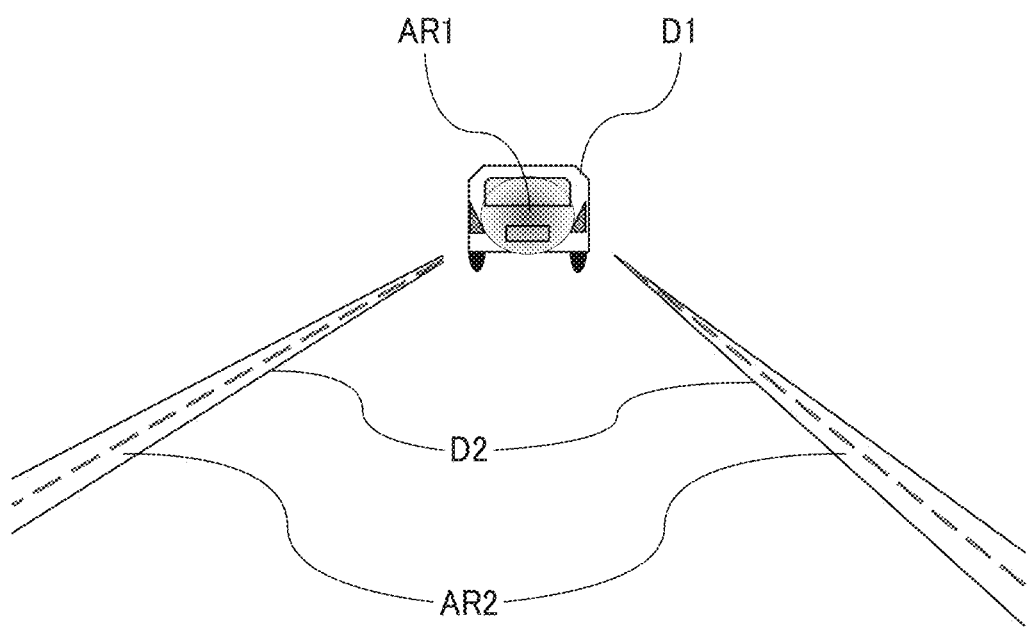
FIG. 11 is an illustration of an augmented reality (AR) overlaid image displayed.

The following describes an example in which the two-dimensional scanning device described above is mounted on a vehicle. FIG. 11 is an example of a displayed image when the display device 100 is mounted on a vehicle as a HUD. A typical example case where the display device 100 is used is to display navigation information such as the speed, mileage, and destination of a vehicle in the field of view of the viewer 3. In recent years, for the purpose of enhancing driving safety, there has been a demand for the HUD to superimpose a display image over a real object, that is, provide the AR superimposition.

For example, as illustrated in FIG. 11, the display AR1 or AR2 such as a highlighted display is AR superimposed on the vehicle D1 and the boundary line D2, which are objects to be recognized by the viewer 3 during the driving, by the HUD. This induces the visual recognition of the viewer 3. For example, when such an AR superimposition is provided, it is more desired that an image be displayed at a proper position with a larger image size in the future. However, during the formation of an image by the two-dimensional scanning of the light deflector 13, an image size and an image-forming position might fluctuate with the environmental temperature or over time, and thus a desired image cannot be obtained.

Figure 12A:
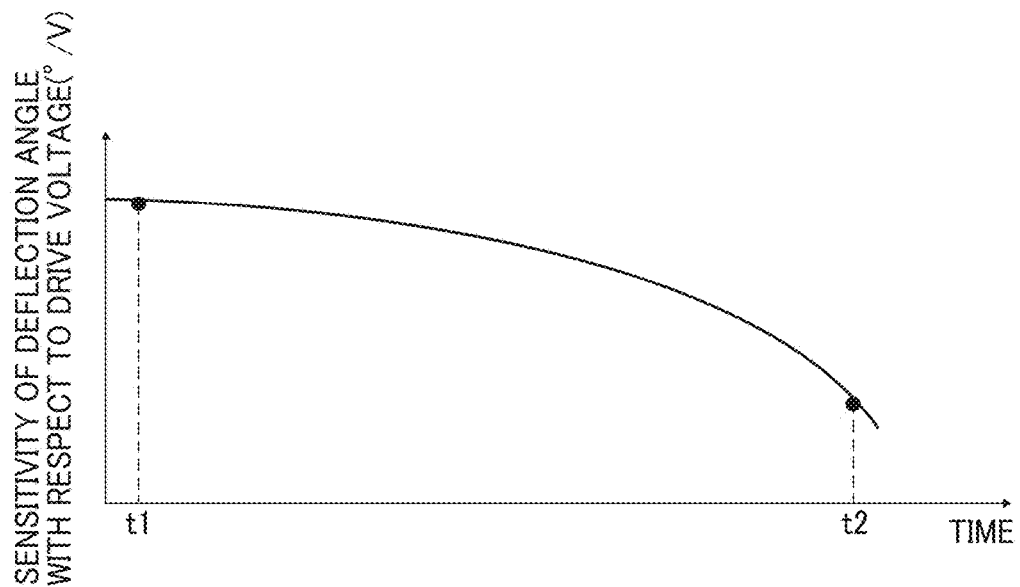
FIGS. 12A and 12B are illustrations for describing a drive voltage and a deflection angle sensitivity of the light deflector.
Figure 12B:
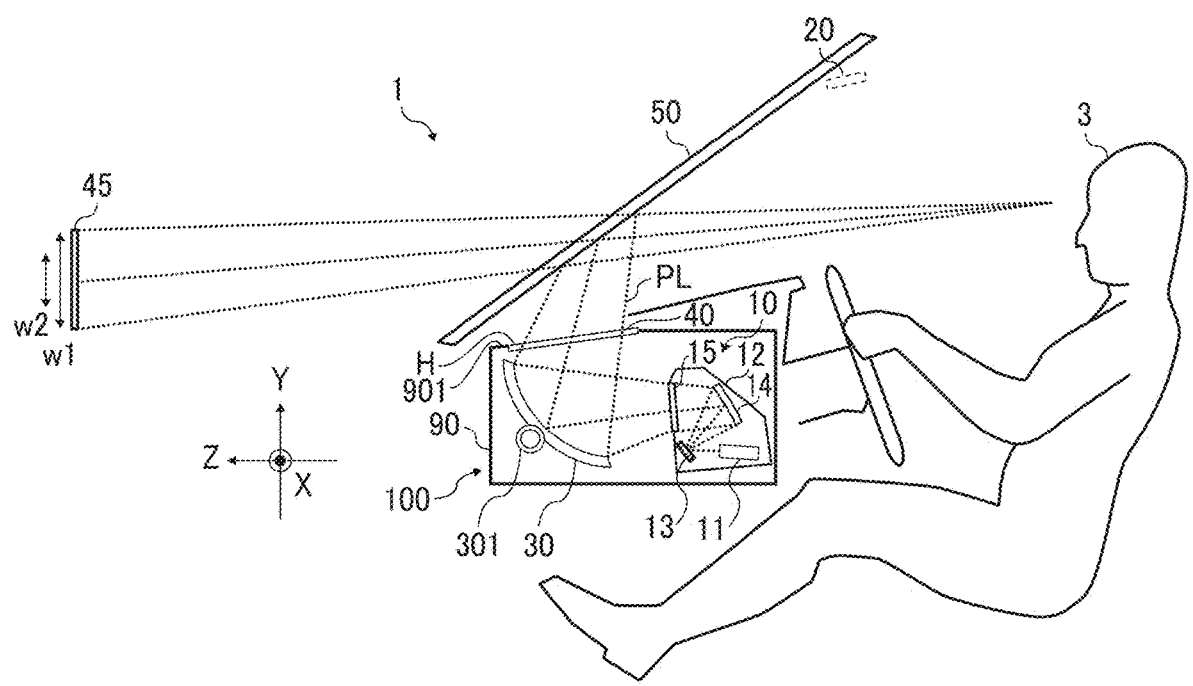

FIGS. 12A and 12B are illustrations of the change in the sensitivity of the mirror 130 with respect to the drive voltage over time.

When an MEMS mirror is used as the mirror 130 as an example, the deflection angle of the mirror 130 with respect to the drive voltage for driving the MEMS mirror (deflection angle sensitivity with respect to the drive voltage of the MEMS mirror) changes with the environmental temperature and over time.

In other words, as illustrated in FIG. 12A, when the drive voltage for driving the MEMS mirror is constant, the deflection angle sensitivity of the mirror 130 decreases with time t2 with respect to the initial state t1. Accordingly, the size w2 of the virtual image 45 at time t2 is smaller than the size w1 of the virtual image 45 at the initial state t1 as illustrated in FIG. 12B. In the present embodiment, the case where the image size in the sub-scanning direction changes is described. However, no limitation is intended therein. The image size in the main scanning direction may change as well.

When the fixed state of each light source in the light deflector 13 and the light-source device 11 fluctuates within the two-dimensional scanning plane with the environmental temperature and over time, the image forming position of the intermediate image 25 formed on the screen 15 varies, and the image forming position of the virtual image 45 that is visually recognized by the viewer 3 in the end varies. Further, when the image forming positions of the red, blue, and green colors are independently changed, the images drawn in the respective colors are spatially shifted, so that the colored images are visually recognized.

Figure 13:
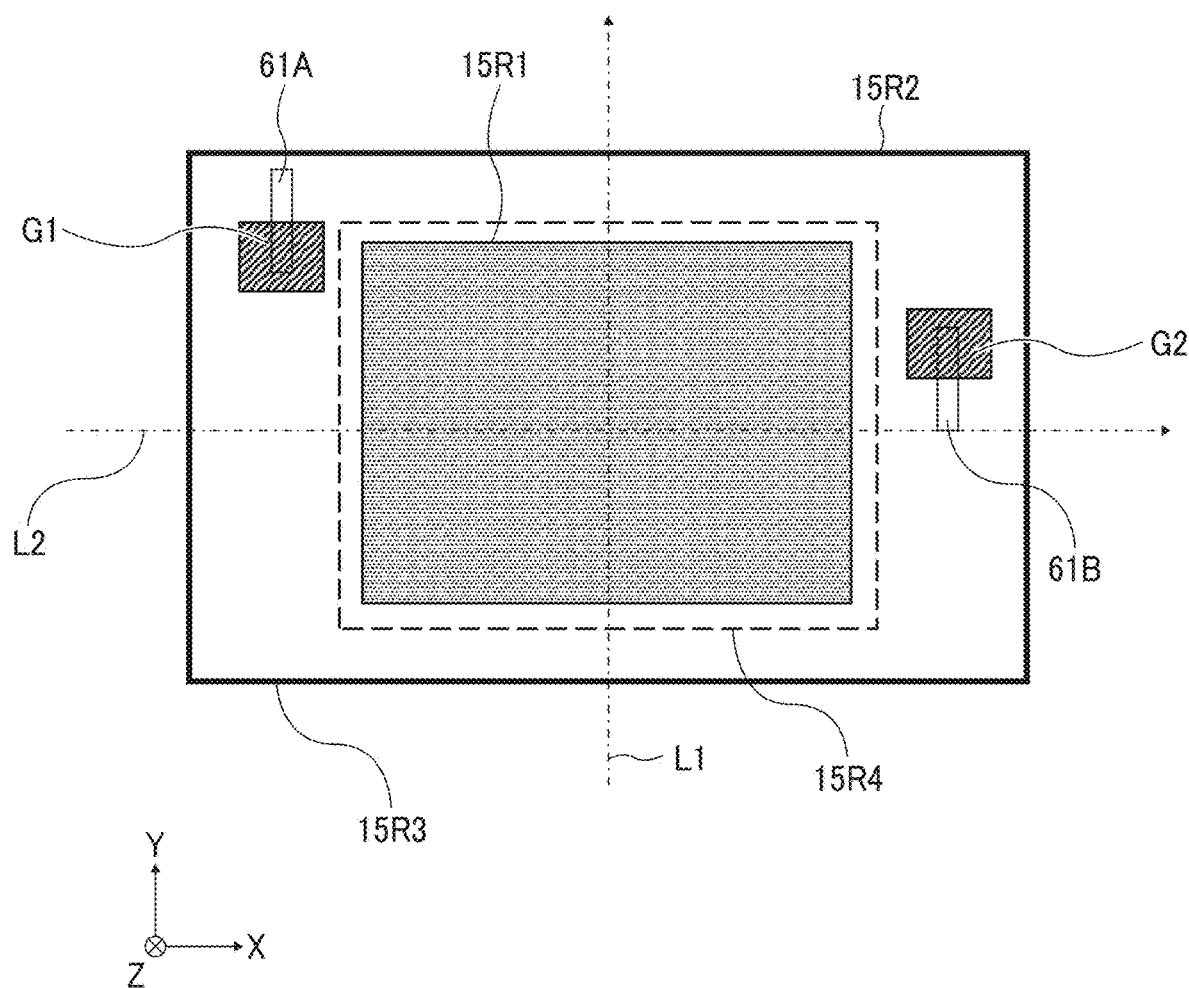
FIG. 13 is an illustration of a configuration for correcting an image according to an embodiment.

FIG. 13 is an illustration of a configuration for correcting an image according to the first embodiment. Specifically, FIG. 13 indicates a display image area 15R1, a non-image area 15R2, light receivers 61A and 61B, a first detection image area G1, and a second detection image area G2, which are in an initial state. The symbol "L1" denotes the center of the main scanning amplitude of the two-dimensional scanning on the screen 15 by the light deflector 13, and the symbol "L2" denotes the center of the sub-scanning amplitude of the two-dimensional scanning on the screen 15 by the light deflector 13.

As illustrated in FIG. 13, the two-dimensional scanning area (the scanning area) 15R3 is extended to the outside of the display image area 15R1, and the light receiver 61 (the light receivers 61A and 61B) are disposed in the non-image area 15R2 that is a scanning area outside the display image area 15R1. Further, the first detection image area G1 to be illuminated with laser light is provided as a certain area including the lower end of the light receiver 61 (one light receiver, for example, 61A), and the second detection image area G2 to be illuminated with laser light is provided as a certain area including the upper end of the light receiver 61 (the other light receiver, for example, 61B) in the sub-scanning direction. The first and second detection image areas G1 and G2 include different positions in the sub-scanning direction. Each of the first and second detection image areas G1 and G2 has a wider width in the main scanning direction than the width of the light receiver 61 in the main scanning direction. Scanning the light-receiving surface of the light receiver 61 in the main scanning direction by the laser light that scans the detection image area G enables the light receiver 61 to detect the scanning timing of the scanning light. Note that the first detection image area G1 is an example of a first area, and the second detection image area G2 is an example of a second area.

As the area on the light receiver 61 is illuminated with laser light, a light signal relating to the scanning state is obtained from the light receiver 61. Using such a signal regarding the scanning state, the controller 17 controls the driving of the light deflector 13 and the light-emission timing of the light-source device 11 so as to adjust the image forming position and the image size. The signal relating to the scanning state is, for example, a time interval to pass through the light receiver 61 or the number of scanning lines that has passed through the light receiver 61.

At this time, it is desirable that the display image area 15R1 be apart from the first and the second detection image areas G1 and G2 by a predetermined interval so as to prevent leakage of light from the first and second detection image areas G1 and G2 to the display image area 15R1. Further, it is also desirable that the size of the display image area 15R1 be smaller than or equal to the size of an optical effective area 15R4 of the screen 15. When there is no need to distinguish the first detection image area G1 and the second detection image area G2, the first detection image area G1 and the second detection image area G2 are sometimes collectively referred to as the detection image area G.

Note that the detection image (an image to be used for detection) formed in the detection image area G may be changed according to what is to be controlled. Further, the detection image may be formed at a predetermined scanning frame interval, or may be formed when a specific condition is satisfied. Further, the detection image may be formed with all of the light sources turned on, or with a specific light source turned on. Alternatively, any light source may be selected to be turned on for each scanning frame.

Figure 14A:
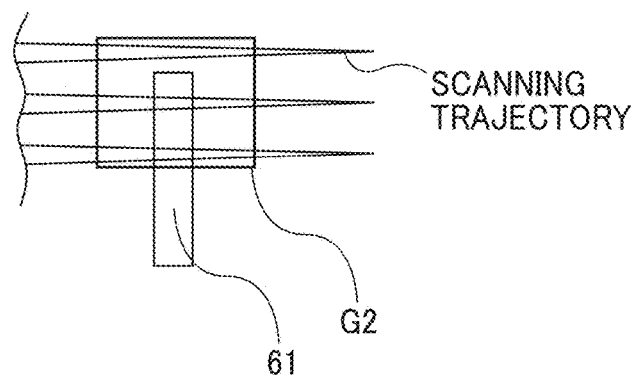
FIGS. 14A, 14B, and 14C are illustrations for describing a detection of a scanning position.
Figure 14B:
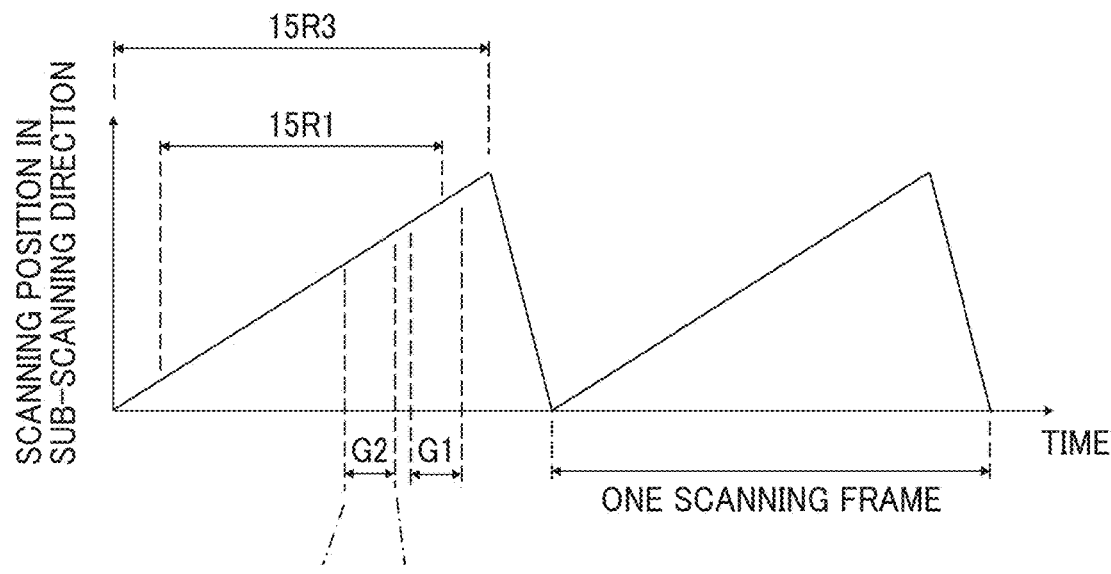
Figure 14C:
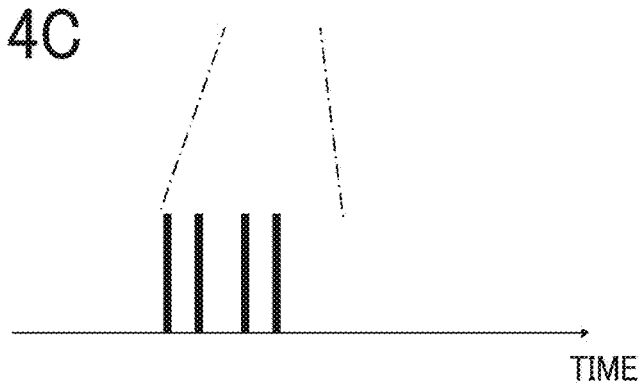

FIG. 14A is an illustration of raster scan being performed on the light receiver 61. FIG. 14B is an illustration for describing the changes in the scanning position in the sub-scanning direction over time during the two-dimensionally scanning. FIG. 14C is an illustration of light signals obtained from the light receiver 61 through the second detection image area G2.

As illustrated in FIG. 14A, the raster scan is performed on the light receiver 61, and light signals are obtained as illustrated in FIG. 14C every time the scanning light passes through the light receiver 61. Accordingly, by counting the number of light signals obtained during the time period between the times to scan the detection image area G, the number of scanning lines that has passed through the light receiver 61 is counted. Adjustment of an image in the sub-scanning direction is performed based on the number of scanning lines (of light received by the light receiver) detected from the illuminated areas of the first and second detection image areas G1 and G2.

Although not described in detail herein, since the timing at which the laser light passes through the light receiver 61 can be detected, the image size and image position in the main scanning direction are controlled, and the drive parameter of the two-dimensional deflection element involved in driving in the main scanning direction is controlled.

Figure 15:
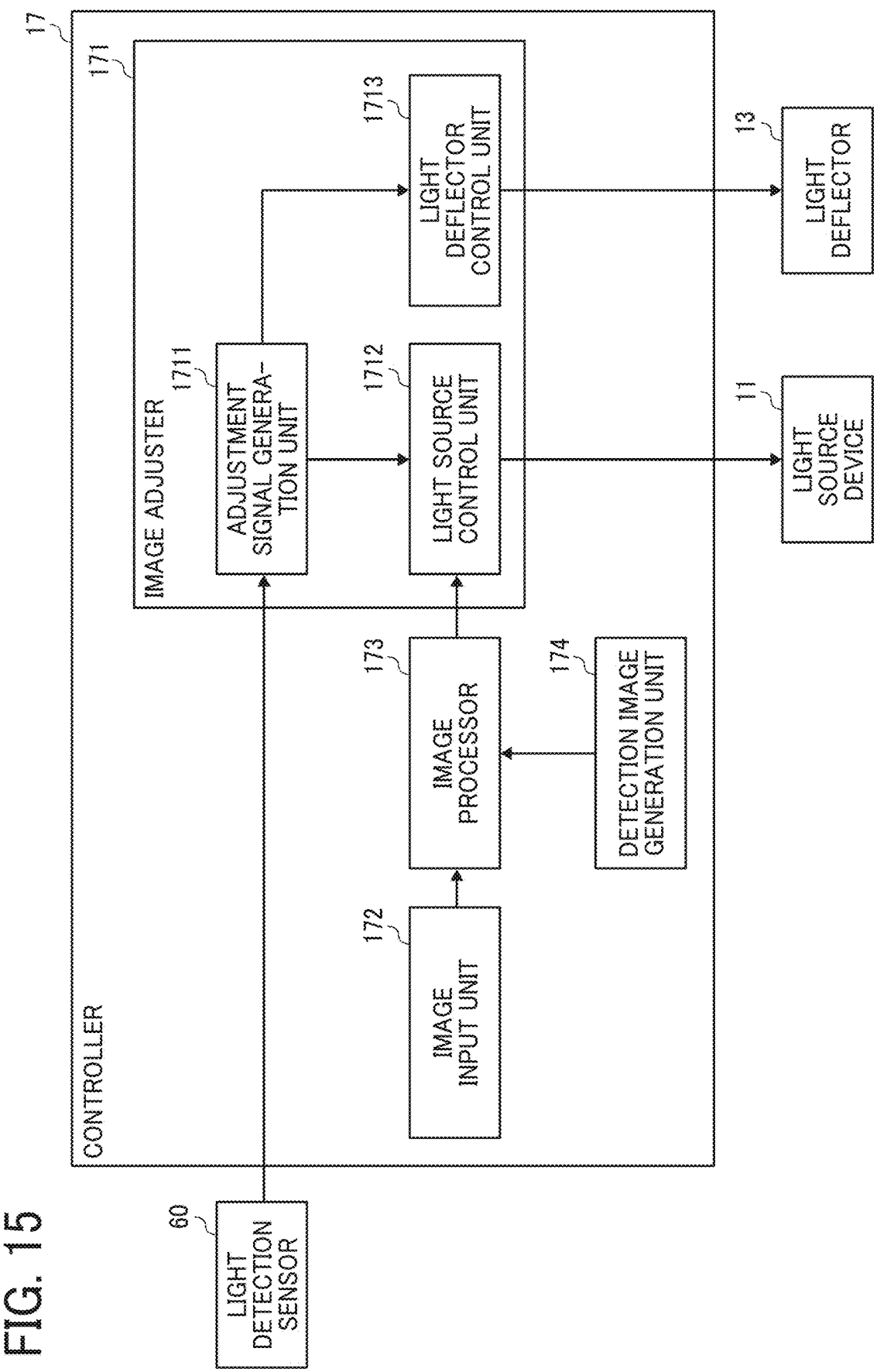
FIG. 15 is a block diagram of a functional configuration of a controller according to the first embodiment.

FIG. 15 is a block diagram of a functional configuration of the controller 17 according to an embodiment. The controller 17 as a control unit includes an image adjustment unit 171, an external image input unit 172, an image processing unit 173, and a detection image generation unit 174. For example, each functional configuration of the controller 17 is implemented by some of the elements illustrated in FIG. 2. In particular, the controller 17 may be implemented by the processing performed by the CPU 1002, the ROM 1003, the FPGA 1001, the LD driver 1008, the MEMS controller 1010, and the motor driver 1012, as well as a computer executable program stored in the ROM 1003.

The image adjustment unit 171 calculates a change in the image forming position and a change in the image size from the initial state based on the light signal output from the light receiver 61.

When the amount of change in the image forming position exceeds a predetermined value (amount), the adjustment signal generation unit 1711 sends an adjustment signal to a light source control unit 1712 so as to adjust the light emission timing of the light-source device 11 thus to adjust the image formation position.

Further, when the amount of change in the image size exceeds a predetermined value (amount), the adjustment signal generation unit 1711 sends an adjustment signal to a light deflector control unit 1713 so as to adjust a deflection angle of the light deflector 13 thus to adjust the image size.

The light source control unit 1712 controls the driving of the light-source device 11 based on the drive signal. Then, the light deflector control unit 1713 periodically controls the driving of the light deflector 13 based on the drive signal.

The external image input unit 172 outputs image data for forming an image to the image processing unit 173. The image input unit 172 outputs image data for forming a display image that is an image to be presented to the user to the image processing unit 173. When the display device 100 is provided for a vehicle as a HUD, an image to be presented to a user includes, for example, the vehicle-related information (e.g., speed and travel distance) and external information (for example, position information from the global positioning system (GPS), routing information from a navigation system, or traffic information) of the vehicle received from an external network. However, no limitation is intended thereby, and an image to be presented to a user may be, for example, an image based on an image regenerative signal read from the television (TV), the Internet, or a recording medium.

The image processing unit 173 generates driving data for the light-source device 11 such as the timing at which laser beams are to be emitted and light-emission intensity (power of light emission), based on the generated image data. The generated driving data is output to the light source control unit 1712. Then, the image processing unit 173 generates driving data for the light-source device 11 such as the timing at which laser beams are to be emitted and light-emission intensity (power of light emission), based on the image data for forming an image to be presented to the user. The generated driving data is output to the light source control unit 1712.

When the image data output from the image input unit 172 is, for example, moving-image data, the image processing unit 173 generates driving data for forming a scanning frame image based on each of the frames constituting the moving image, that is, each image corresponding to one screen included in the moving image, so as to sequentially display virtual images 45. For example, one frame of the moving images may be displayed using the scanning-frame images in two continuous cycles of two-dimensional scanning.

The light source control unit 1712 controls the light emission (illumination control) of the light-source device 11 based on the driving data and the adjustment signal from the adjustment signal generation unit 1711.

The detection image generation unit 174 outputs the image data of a detection image to be received by the light receiver 61 to the image processing unit 173.

FIGS. 16A and 16B are illustrations for describing a change in the number of scanning lines of received light due to a change in the image size in the sub-scanning direction.

Specifically, FIG. 16A indicates a display image area 15R1, a two-dimensional scanning area 15R3, a first detection image area G1, and a second detection image area G2 on the light receiver, which are in an initial state. The initial state refers to a state in which an adjustment is made to obtain a desired image size and a desired image position before shipping the product. Two light receivers 61A and 61B are disposed substantially diagonally in one of areas obtained by dividing the two-dimensional scanning area 15R3 by the sub-scanning amplitude center L2.

FIG. 16B is an illustration of an image size that has been reduced from the initial state in the sub-scanning direction. The image size is reduced in the sub-scanning direction, for example, due to the changes in the sensitivity with respect to the drive voltage of the MEMS mirror over time as described with reference to FIG. 12A. Similar phenomena can also occur due to the change in sensitivity with temperature or the change in the property of the optical system.

As described with reference to FIG. 16B, the adjustment of an image in the sub-scanning direction is performed based on the number of scanning lines (of received light) detected from the illuminated first and second detection image areas G1 and G2. As the overlapping areas of the light receiver and each of the first detection image area G1 and the second detection image area G2 increase, the number of scanning lines of received light increases. FIGS. 16A and 16B indicate an overlapping area A of the first detection image area G1 and the light receiver, an overlapping area B of the second detection image area G2 and the light receiver, an overlapping area A' of the first detection image area G1 and the light receiver when the image size is changed, and an overlapping area B' of the second detection image area G2 and the light receiver when the image size is changed. The value obtained by dividing the overlapping area of the illuminated area (the detection image area) and the light receiver by the sub-scanning interval of the raster scan on the light receiver is the number of scanning lines received by the light receiver, which are referred to as NA, NB, NA', NB', respectively. NA is an example of a predetermined number of scanning lines in the first area. NB is an example of a predetermined number of scanning lines in the second area.

For the scanning line obtained from the first detection image area G1, $\Delta$NA that is an increase/decrease amount in change in the number of scanning lines from the initial state in FIG. 16A to the changed image size in FIG. 16B is obtained by subtracting the value of NA from the value of NA' ($\Delta$NA=NA'−NA). Similarly for the scanning line obtained from the second detection image area G2, $\Delta$NB that is an increase/decrease amount in the number of scanning lines from the initial state in FIG. 16A to the changed image size in FIG. 16B is obtained by subtracting the value of NB from the value of NB' ($\Delta$NB=NB'−NB). The adjustment control is performed to maintain the sum of $\Delta$NA and $\Delta$NB ($\Delta$NA+$\Delta$NB) constant, so that the change in the image size from the initial state can be reduced or prevented. The image size can be controlled by adjusting the drive voltage applied to the mirror 130. $\Delta$NA is an example of the amount of change from a predetermined value (predetermined number)

in the first area. ΔNB is is an example of the amount of change from a predetermined value (predetermined number) in the second area.

The changes in the number of scanning lines (of received light) from the initial state occurs due to the change in the image size as well as due to the change in the image position to be described later. However, by performing the adjustment control to maintain a constant total value of ΔNA and ΔNB (ΔNA+ΔNB), which are the increase/decrease amount in the number of scanning lines in the two illuminated areas, respectively, the adverse effect due to the change in the image position can be eliminated, and the change in the image size can be independently detected. For example, it is possible to detect the occurrence of a shift in the sub-scanning direction based on the change in the number of scanning lines of light in only one illuminated area. However, it is impossible to determine whether such a shift is due to the change in image size or the change in image position, and thus a proper adjustment is difficult to perform. In the present embodiment, the shift in the sub-scanning direction is detected based on the number of scanning lines of light in each of the two illuminated areas at different locations in the sub-scanning direction. Accordingly, the shift in the sub-scanning direction can be detected at high accuracy and the change from the initial state can be reduced or prevented without using, for example, a detector provided with a high-cost area sensor or a special V-shaped slit.

FIGS. 17A and 17B are illustrations for describing a change in the number of scanning lines of received light due to a change in the image position in the sub-scanning direction.

Specifically, FIG. 17A indicates a display image area 15R1, a scanning area 15R3, a first detection image area G1, and a second detection image area G2 on the light receivers 61A and 61B, which are in an initial state.

FIG. 17B is an illustration of an image position in the sub-scanning direction that has been shifted (changed) in −Y' direction from the initial state by ΔY. The cause of the change in the image position in the sub-scanning direction is, for example, a change in the position of a component of the optical system.

Same as in FIGS. 16A and 16B, FIGS. 17A and 17B also indicate an overlapping area A of the first detection image area G1 and an overlapping area B of the second detection image area G2, which are in the initial state. FIGS. 17A and 17B also indicate the overlapping area A" of the first detection image area G1 and the light receiver and the overlapping area B" of the second detection image area G2 and the light receiver, which are at the time at which the image position has been changed.

As can be seen from FIGS. 16A, 16B, 17A, and 17B, the number of scanning lines that is detected by lighting of the first detection image area G1 decreases from the number in the initial state when the image size is reduced, and also decreases from the number in the initial state when the image position is shifted in the −Y' direction. Similarly, the number of scanning lines that is detected by lighting of the second detection image area G2 increases from the number in the initial state when the image size is reduced, and also increases from the number in the initial state when the image position is shifted in the −Y' direction. Under actual use conditions, the change in image size and the change in image position occur at the same timing. Accordingly, the change in image size and the change in mage position need to be detected independently so as to control them with high accuracy.

In the following description, the increase/decrease amount in the number of the scanning lines with the image position changed (shifted) is considered. When the image position is shifted, the display image area 15R1, the scanning area 15R3, and the first detection image area G1 and the second detection image area G2 on the light receiver are each shifted in parallel in the −Y' direction by ΔY. Since the positions of the light receivers 61A and 61B are not shifted, the following equations are established: A−ΔY=A" and B+ΔY=B" As a result, the following equation is induced: A"−A=(B"−B)×(−1). That is, the increase/decrease amount in the number of scanning lines detected from the lighting of the first detection image area G1 is equal to the increase/decrease amount in the number of scanning lines detected from the lighting of the second detection image area G2. In addition, the signs are opposite to each other.

Accordingly, as described above, in controlling the change in the image size, the sum of ΔNA and ΔNB (ΔNA+ΔNB) is adjusted to be maintained constant so that the cause of the change in the image position is eliminated, and the change in the image size is independently detected and controlled.

The following describes the independent detection of the change in the image position. The increase/decrease amount in the number of scanning lines detected by the lighting of the first detection image area G1 is expressed by formula 1 below when a change in image size and a change in image position occur at the same timing.

$$\Delta NA = \alpha(ha) + \Delta NY \quad (1),$$

where α (ha) is an increase/decrease amount of the number of scanning lines when the image size changes, which depends on the heights of the end portions of the light receivers 61A and 61B. The heights of the end portions of the light receivers 61A and 61B are indicated by symbols hA and hB in FIG. 17A. Hereinafter, the increase/decrease amount in the number of scanning lines received when the image size changes is represented by α (ha) for the first detection image area G1 and α (hb) for the second detection image area G2. In addition, the ratio of α (hb) with respect to α (ha) is equal to k (α (hb)/α (ha)=k). ΔNY is the number of scanning lines received when the image position is shifted by ΔY.

As described above, those caused by the change in image position are eliminated by the sum of ΔNA and ΔNB (ΔNA+ΔNB), which is expressed by formula (2) below.

$$\Delta NA + \Delta NB = \alpha(ha) - \alpha(hb) \quad (2).$$

Formulae (1) and (2) lead to Formula (3) below:

$$\Delta NY = \{NA - \{(\Delta NA + \Delta NB)/(1-k)\}\} \quad (3).$$

When the equation: 1/(1−k)=K is established, formula (3) is represented by formula (4) below:

$$\Delta NY = \Delta NA \times (1-K) - \Delta NB \times K \quad (4).$$

As described above, using formula (4), the change in the image position is independently detected and controlled based on the change in the number of scanning lines received in the first detection image area G1 and the change in the number of scanning lines received in the second detection image area G2. This enables a change in the image position from the initial state to be substantially prevented. In formulae (3) and (4), k and K are parameters based on the sub-scanning positions of the lower end of the light receiver included in the first detection image area G1 and the upper end of the light receiver included in the second detection image area G2, and these parameters are known parameters.

Figure 18:
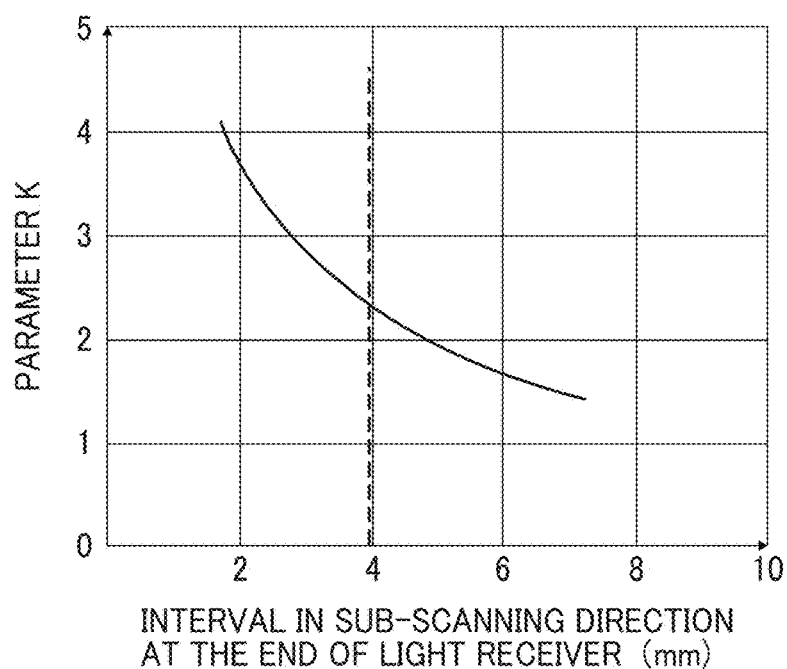
FIG. 18 is a graph indicating the relation of a parameter K and a position of the edge of the light receiver in the sub-scanning direction.

FIG. 18 is a graph indicating the relation of a parameter K and a position of the end portion of the light receiver in the sub-scanning direction. In FIG. 18, the horizontal axis denotes the interval in the sub-scanning direction between the lower end of the light receiver included in the first detection image area G1 and the upper end of the light receiver included in the second detection image area G2, and the vertical axis denotes the value of K. As illustrated in FIG. 18, as the interval in the sub-scanning direction increases, the value of K decreases. Note that the values of the intervals in the sub-scanning direction indicated by the horizontal axis and the parameters of the vertical axis in FIG. 18 are merely examples, and no limitation is intended thereby.

In the present embodiment, the change in the image position is calculated from the change in the number of scanning lines received in the first detection image area G1 and the change in the number of scanning lines received in the second detection image area G2, using formula (4). When an error occurs in the number of scanning lines of each area, the error in calculation of the change in image position increases with an increase in K.

For example, the value of K is 3 (K=3) when the sub-scanning interval between the end portions of the light receivers is as indicated by the dotted line in FIG. 18. When an error of one scanning line occurs in the number of scanning lines of $\Delta NB$, the control error is enlarged three times and calculated as the control error. That is, in order to obtain the amount of change in the image position with higher accuracy, it is preferable that the sub-scanning interval between the first detection image area G1 and the second detection image area G2 is wider, that is, the sub-scanning interval between the light receivers 61A and 61B is wider. Accordingly, the arrangement of the light receivers 61A and 61B at substantially diagonal positions on the screen 15 enables a high-accuracy detection.

Figure 19:
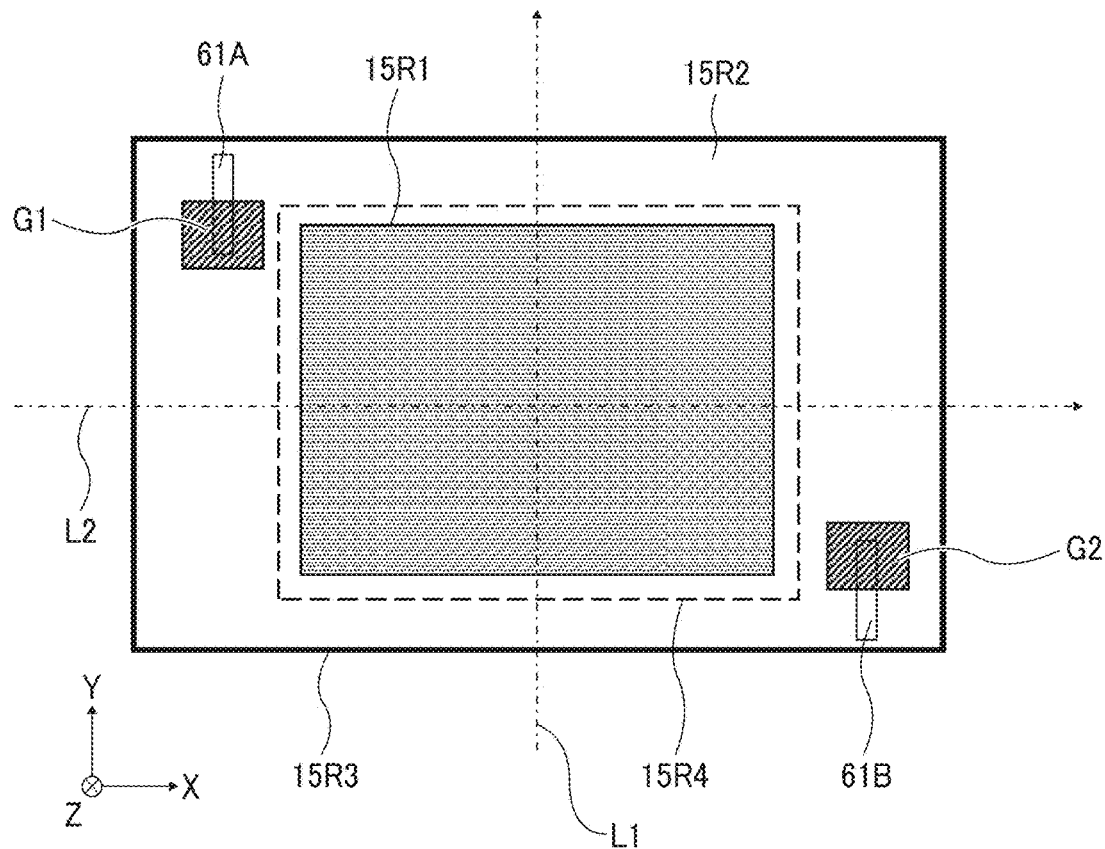
FIG. 19 is an illustration of a variation of the position of the light receiver according to the first embodiment.

FIG. 19 is a first variation of the first embodiment of the present disclosure. The layout of the light receivers 61A and 61B, the first detection image area G1, and the second detection image area G2 is not limited to that in FIG. 13, but may be a layout as illustrated in FIG. 19. In this case, the image size and the image position can be adjusted in the same way as in FIG. 13.

Figure 20:
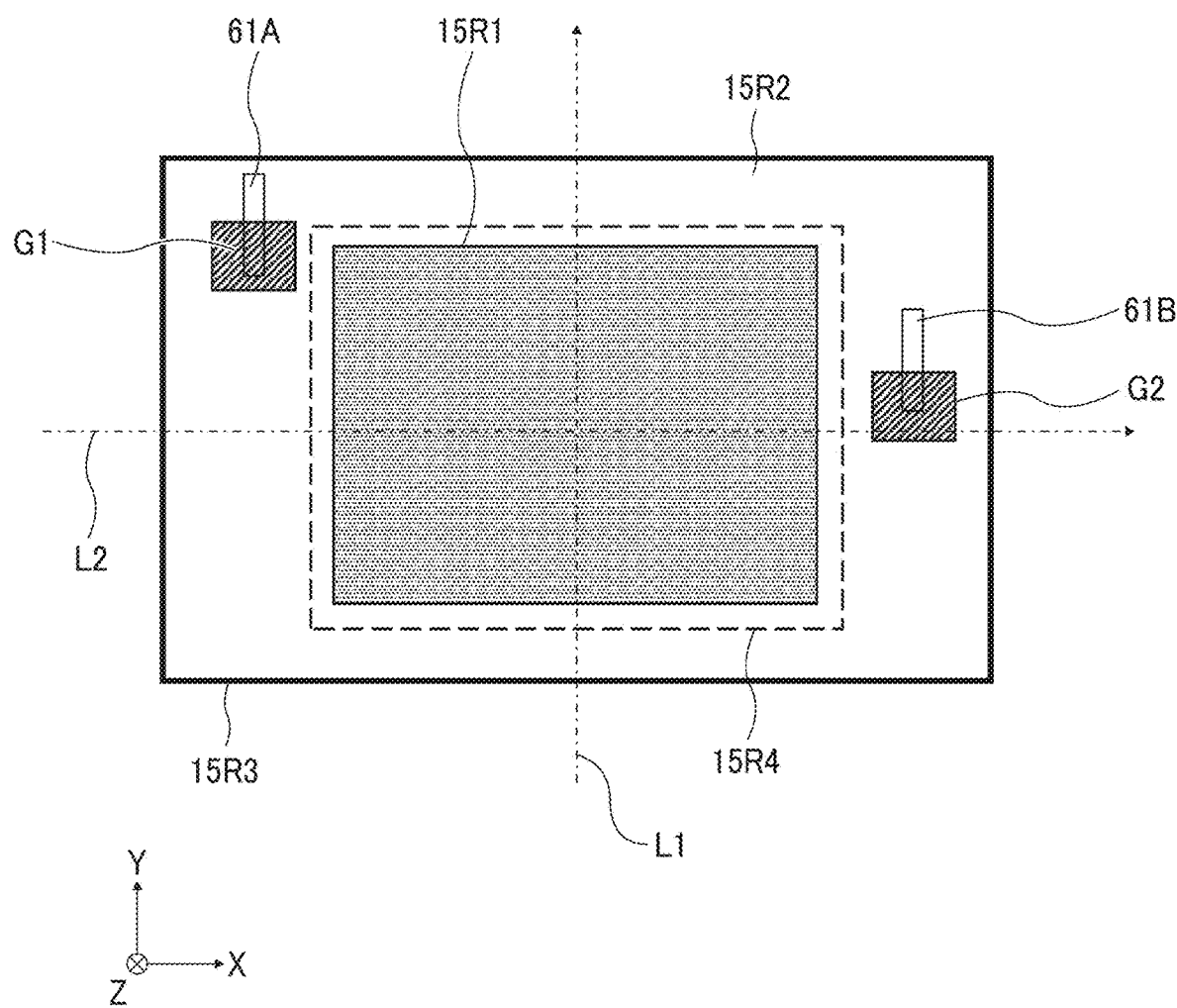
FIG. 20 is an illustration of another variation of the position of the light receiver according to the first embodiment.

FIG. 20 is an illustration of a second variation of the first embodiment. Specifically, FIG. 20 is an illustration of a configuration that differs in the relative positions of the light receiver 61B and the second illuminated area.

In the above description, the relative positions of the light receivers and the illuminated areas are set such that the first detection image area G1 includes the lower end of the light receiver and the second detection image area G2 includes the upper end of the light receiver. However, no limitation is intended thereby. As illustrated in FIG. 20, the first detection image area G1 may include the lower end of the light receiver and the second detection image area G2 may include the lower end of the other light receiver. In such a configuration, different formulae are used for detecting and controlling the change in image size and the image position, but the same concept may be applied.

For example, in the case of the change in image size, the adjustment control is performed to maintain a constant difference value between the increase/decrease amount $\Delta NA$ of the number of scanning lines in the first detection image area G1 and the increase/decrease amount $\Delta NB$ of the number of scanning lines in the second detection image area G2 ($\Delta NA-\Delta NB$), so that the change in the image size from the initial state can be reduced or prevented. As is clear from the above description, by using such a formula, the adverse effect due to the change in image position can be eliminated. Further, the detection control of the change in image position may be considered in the same manner as described above.

The change in the number of scanning lines from the initial state is caused not only by the change in the image size described above but also by the change in the image position described later. However, by performing the adjustment control to maintain a constant difference value between $\Delta NA$ and $\Delta NB$ ($\Delta NA-\Delta NB$), which are the increase/decrease amount in the number of scanning lines in the two illuminated areas, respectively, the adverse effect due to the change in the image position can be eliminated, and the change in the image size can be independently detected. For example, it is possible to figure out the occurrence of a shift in the sub-scanning direction based on the change in the number of scanning lines of light in one lighting area. However, it is impossible to determine whether such a shift is due to the change in image size or the change in image position, and thus a proper adjustment is difficult to perform. In the present embodiment, the shift in the sub-scanning direction is detected based on the number of scanning lines of light in each of the two illuminated areas at different locations in the sub-scanning direction. Accordingly, the shift in the sub-scanning direction can be detected at high accuracy and the change from the initial state can be reduced or prevented without using, for example, a detector provided with a high-cost area sensor or a special V-shaped slit.

In formulae (3) and (4), k and K may be determined based on the sub-scanning positions of the lower end of the light receiver 61A included in the first detection image area G1 and the lower end of the light receiver 61B included in the second detection image area G2. Further, in the present embodiment, the light receivers 61A and 61B have substantially the same shape and are arranged facing in substantially the same direction in the scanning area. However, no limitation is intended thereby.

Figure 21:
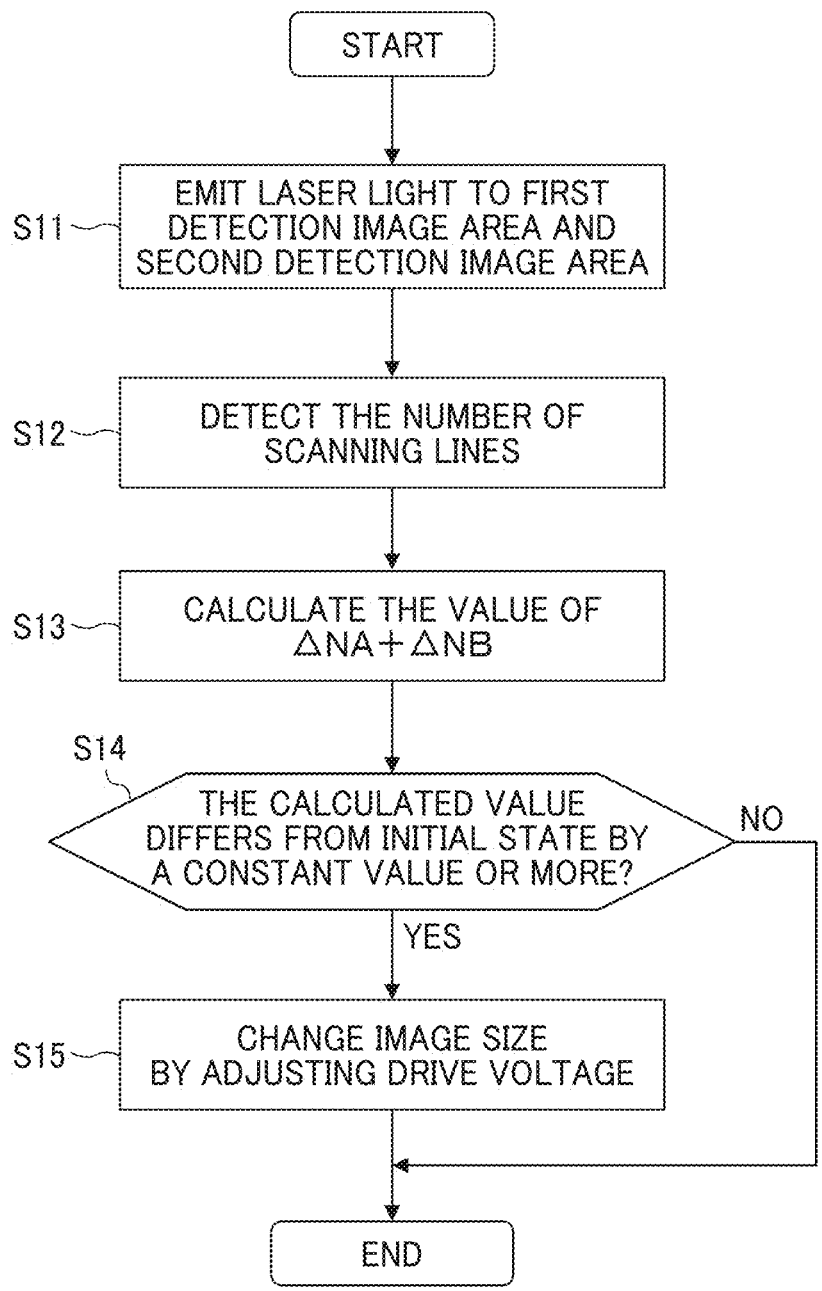
FIG. 21 is a flowchart for describing an example of a control of correction of an image size.

FIG. 21 is a flowchart for describing an example of a process of adjusting image size. In the flowchart in FIG. 21, the position of the scanning light is changed so that the image size is adjusted at constant frame intervals.

The light-source device 11 emits laser light to the first detection image area G1 and the second detection image area G2 under the control of the light source control unit 1712 (in step S11) so as to form a detection image (image for detection).

Then, the light detection sensor 60 detects the lighting in step S11 by using the light receiver 61 and outputs a detection signal. In step S12 as detection step, the adjustment signal generation unit 1711 detects the number of scanning lines based on the signal output from the light detection sensor 60. For example, the number of light signals output from the light receivers 61A and 61B within the time during which the first detection image area G1 and the second detection image area G2 are scanned is counted, so as to obtain the number of scanning lines.

In step S13 as calculation step, the adjustment signal generation unit 1711 calculates the sum of $\Delta NA$ and $\Delta NB$ (the value of $\Delta NA+\Delta NB$) based on the number of scanning lines obtained from the first detection image area G1 and the second detection image area G2.

Further, the adjustment signal generation unit 1711 compares the calculated value of $\Delta NA+\Delta NB$ with the value of $\Delta NA$ and $\Delta NB$ in the initial state whose value has been obtained in advance before shipping of product, so as to determine whether the calculated value differs from the value of the initial state by a constant value or more (whether the difference value is more than or equal to a constant value) (in step S14). When the difference value is less than the constant value (No in step S14), the adjustment process for a target frame ends because no adjustment is needed. When the difference value is more than or equal to the constant value (Yes in step S14), the process proceeds to step S15 to perform the adjustment.

Then, in step S15 as scanning-position change step, the light deflector control unit 1713 changes the position of the scanning light in the sub-scanning direction to change the image size. For example, the drive voltage is adjusted based on the difference value calculated in step S14, and the adjusted voltage is applied to the mirror 130. For such an adjustment, the relation between $\Delta NA+\Delta NB$ and the drive voltage may be acquired in advance, and the voltage value may be uniquely determined based on the characteristics of the relation. Alternatively, any desired value for the adjustment step may be set as a maximum voltage value adjustment width.

By adjusting the image size at constant frame intervals in such a manner, an appropriate image display is provided.

Figure 22:
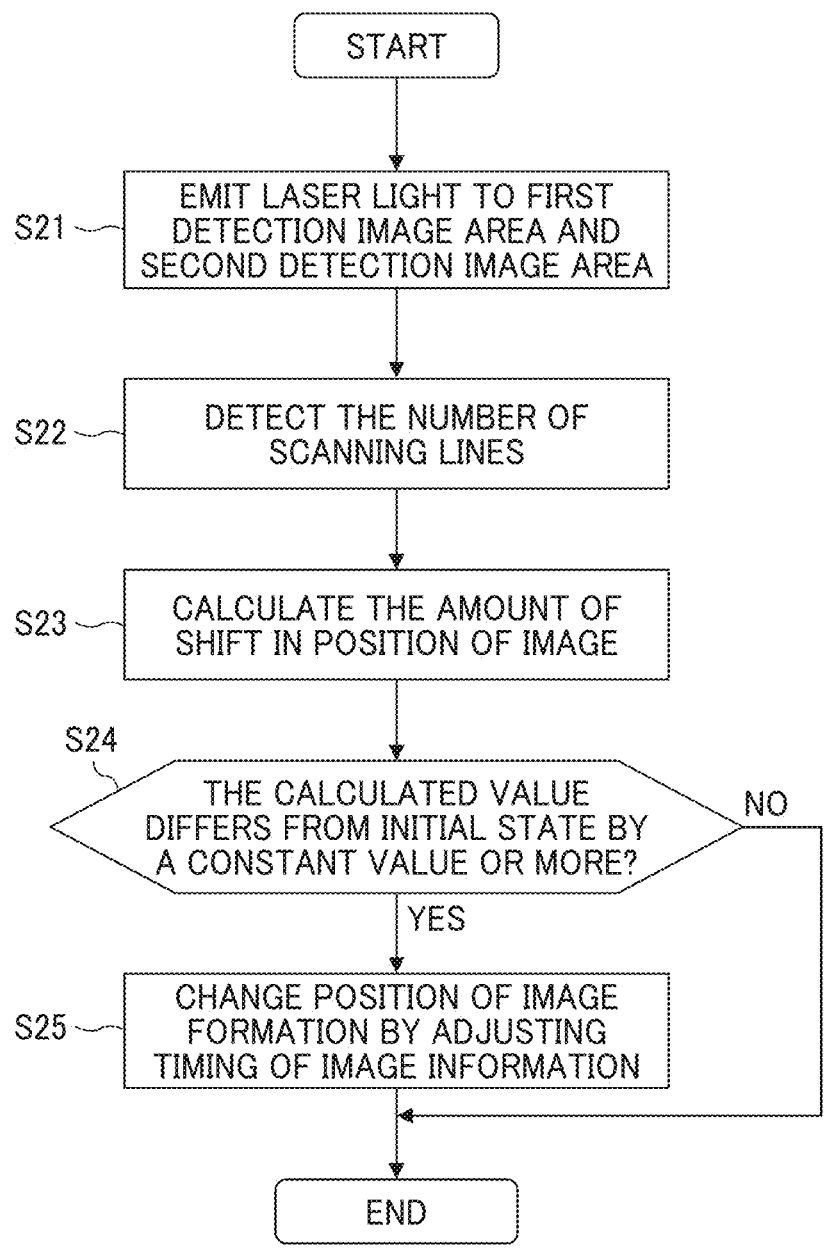
FIG. 22 is a flowchart for describing an example of a control of correction of an image position.

FIG. 22 is a flowchart of an example of a process of adjusting image position. In the flowchart in FIG. 22, the position of the scanning light is changed so that the image position is adjusted at constant frame intervals.

The light-source device 11 emits laser light to the first detection image area G1 and the second detection image area G2 under the control of the light source control unit 1712 (in step S21) so as to form a detection image (image for detection).

Then, the light detection sensor 60 detects the lighting in step S21 by using the light receiver 61 and outputs a detection signal. In step S22 as detection step, the adjustment signal generation unit 1711 detects the number of scanning lines based on the signal output from the light detection sensor 60. For example, the number of light signals output from the light receivers 61A and 61B within the time during which the first detection image area G1 and the second detection image area G2 are scanned is counted, so as to obtain the number of scanning lines.

In step S23 as calculation step, the adjustment signal generation unit 1711 calculates the amount of change in the image position based on the number of scanning lines obtained from the first detection image area G1 and the second detection image area G2. In the calculation, the above-described formula (4), formulae (5) and (6) to be described later are used.

Further, the adjustment signal generation unit 1711 compares the calculated amount of change in the image position with the value of the image position in the initial state whose value has been obtained in advance before shipping of product, so as to determine whether the calculated value differs from the value of the initial state by a constant value or more (whether the difference value is more than or equal to a constant value) (in step S24). When the difference value is less than the constant value (No in step S24), the adjustment process for a target frame ends because no adjustment is needed. When the difference value is more than or equal to the constant value (Yes in step S24), the process proceeds to step S25 to perform the adjustment.

Then, in step S25 as scanning-position change step, the light source control unit 1712 changes the position of the scanning light in the sub-scanning direction to change the image position. For example, based on the difference value obtained in step S24, the light-emission timing of the light-source device 11 is adjusted according to image information, and the image information for which the light-emission timing of the light-source device 11 has been adjusted is output to the light-source device 11. The light-source device 11 emits laser light based on the received image information so that the image position is adjusted.

By adjusting the image position at constant frame intervals in such a manner, an appropriate image display is provided.

Figure 23:
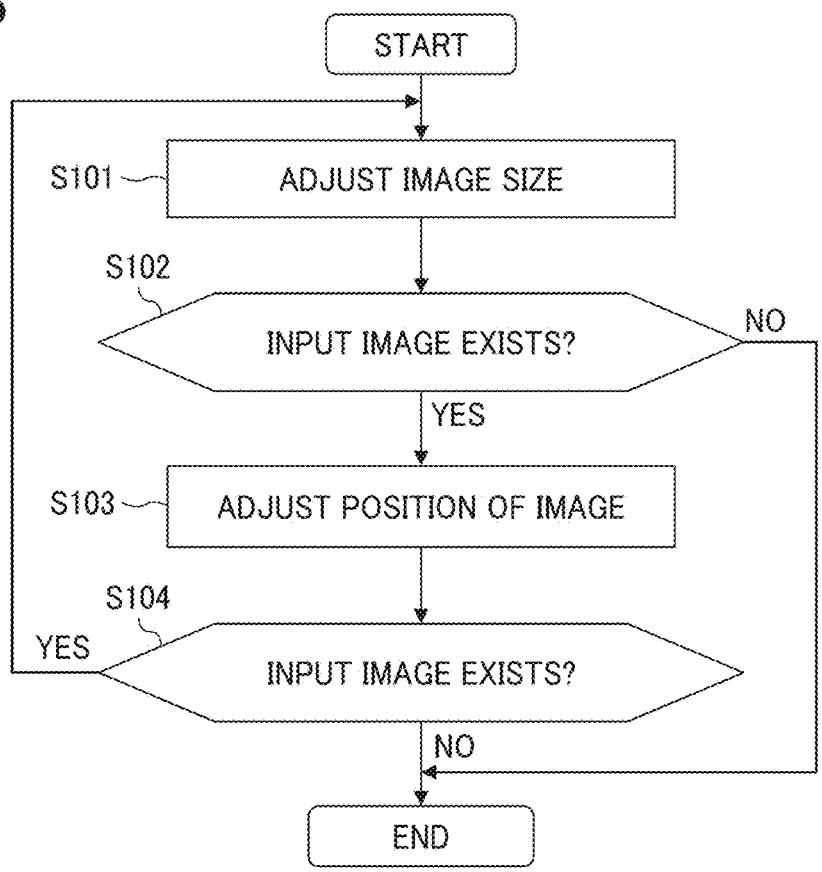
FIG. 23 is a flowchart for describing an example of a control of image display by controlling the image correction.

FIG. 23 is a flowchart for explaining the control of image display by using the process of adjusting the image size and the process of adjusting the image position.

In the process flow in FIG. 23, for example, the process starts in response to an input of an image from the image input unit 172. The control unit 17 first adjusts an image size (in step S101). This adjustment of the image size is, for example, the process of adjusting image size described with reference to FIG. 21. In step S102, the control unit 17 determines whether another image is input.

When the control unit 17 determines that another image is input (Yes in step S102), the process proceeds to step S103 to adjust the image position (step S103). This adjustment of the image position in step S103 is, for example, the process of adjusting the image position described with reference to FIG. 22. When the control unit 17 determines that another image is not input (No in step S102), the process in FIG. 23 ends.

When the process in step S103 ends, the control unit 17 determines whether still another image is input (step S104). When the control unit 17 determines that still another image is input (Yes in step S104), the process returns to step S101. When the control unit 17 determines that still another image is not input (No in step S104), the process in FIG. 23 ends.

Thus, the process of adjusting image size in FIG. 21 and the process of adjusting image position in FIG. 22 are performed at constant scanning frame intervals. Accordingly, an image display device that is capable of displaying high-quality images can be provided.

In the example case of FIG. 23, the adjustment of the image position and the adjustment of the image size are alternately performed in sub-scanning periodic intervals, that is, for each scanning. However, no limitation is intended thereby. For example, the process of adjusting the image position may be performed at two sub-scanning periodic intervals, that is, for two consecutive sub-scanning lines, and the process of adjusting the image size may be performed for next two consecutive sub-scanning lines. Alternatively, the process of adjusting the image position may be performed for one sub-scanning line, and the process of adjusting the image size may be performed for next two consecutive sub-scanning lines.

As described above, by repeating the process of adjusting the image size and the process of adjusting the image position for one scanning frame at the certain number of scanning frame intervals, high-quality images are displayed.

As described above, in the embodiments, based on the number of scanning lines in each of the first area and the second area, each of which includes a different position in the sub-scanning direction, the sub-scanning position of the scanning light are made different. Accordingly, the position of an image formed within the scanning range in the sub-scanning direction can be made different, and the position of the display image to be visually recognized by the viewer 3 can also be made different. Further, the position of the image formed within the scanning range in the sub-scanning direction can be made different, and the size of the display image to be visually recognized by the viewer 3 in the sub-scanning direction can be also made different. That is, it is possible to substantially prevent a deterioration in image quality due to the shift of the scanning lines in the sub-scanning direction. Further, images can be appropriately adjusted without using an expensive detector such as an area sensor.

Figure 24:
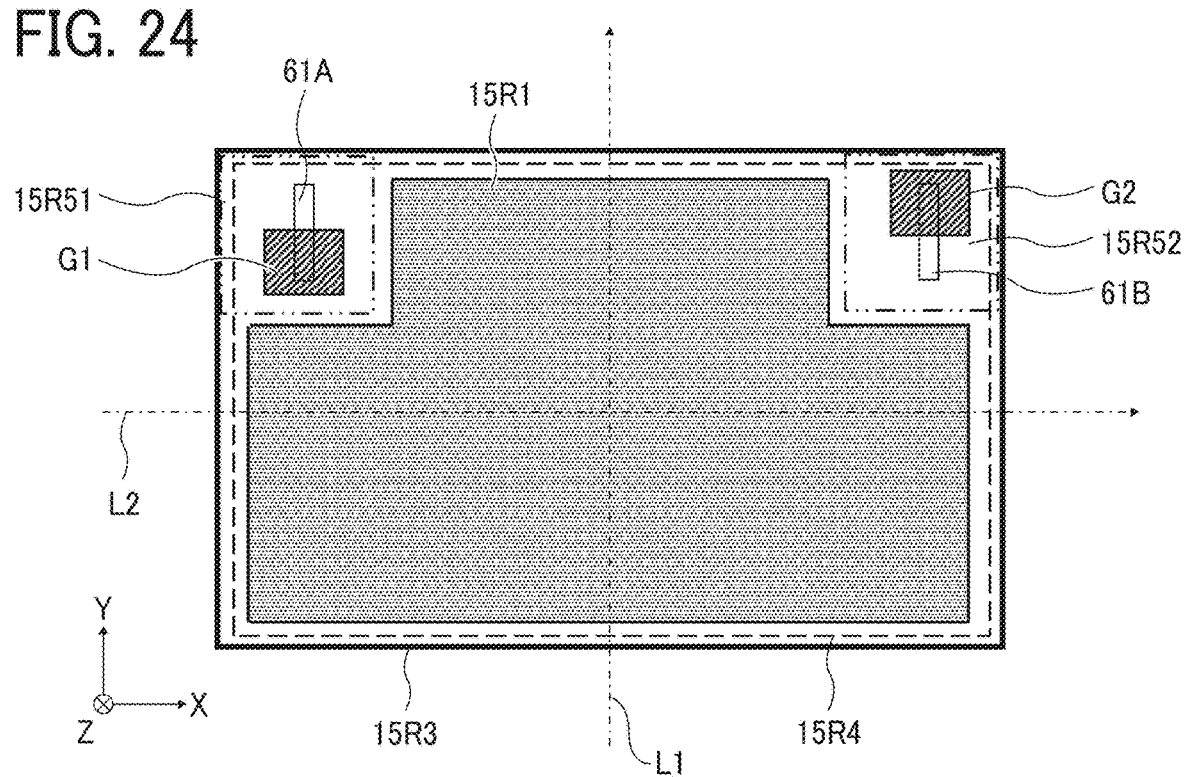
FIG. 24 is an illustration of a configuration for correcting an image according to a second embodiment.

FIG. 24 is an illustration of a configuration for correcting an image according to the second embodiment. In the first embodiment illustrated in FIG. 13, the light receiver that receives light of the first detection image area G1 and the light receiver that receives light of the second detection image area G2 are disposed away from each other in the sub-scanning direction. In the second embodiment as illustrated in FIG. 24, the light receiver that receives light of the first detection image area G1 and the light receiver that receives light of the second detection image area G2 are disposed in substantially horizontal positions in the main scanning direction.

With such an arrangement, a part of the two-dimensional scanning area 15R3, which is unavailable as the display image area 15R1 due to the presence of the light receivers 61 and the second detection image area G2 as in FIG. 13, can be used as the display image area 15R1. Thus, a larger image can be displayed in the main scanning direction.

In this case as well, the amount of change in the image position is calculated using formula (4) as described above. This calculation can be performed at a higher accuracy with a wider sub-scanning interval between the light receivers. Thus, the case, in which the amount of change in the image position is calculated with a smaller sub-scanning interval as in the second embodiment of FIG. 24, is considered below.

That is, the calculation of the amount of change in the image position according to the second embodiment illustrated in FIG. 24 is performed using formula (5) or (6) below.

$$\Delta NY = \Delta NA \quad (5)$$

or $$\Delta NY = \Delta NB \times -1 \quad (6)$$

Figure 25A:
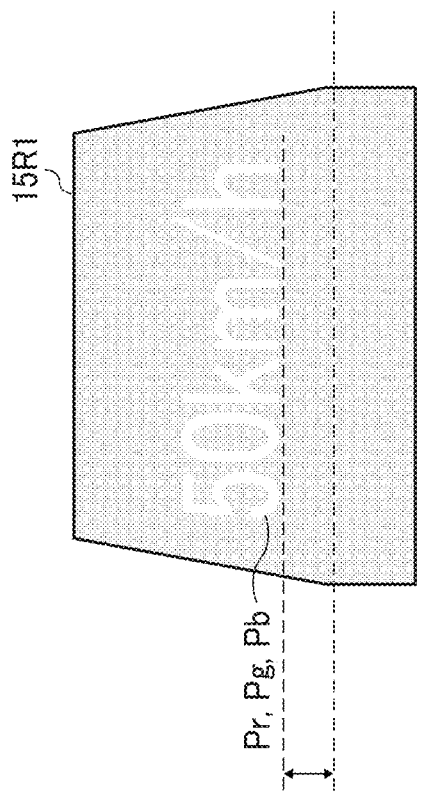
FIGS. 25A and 25B are illustrations of examples of a display image according to a calculation formula of an image position shift amount.
Figure 25B:
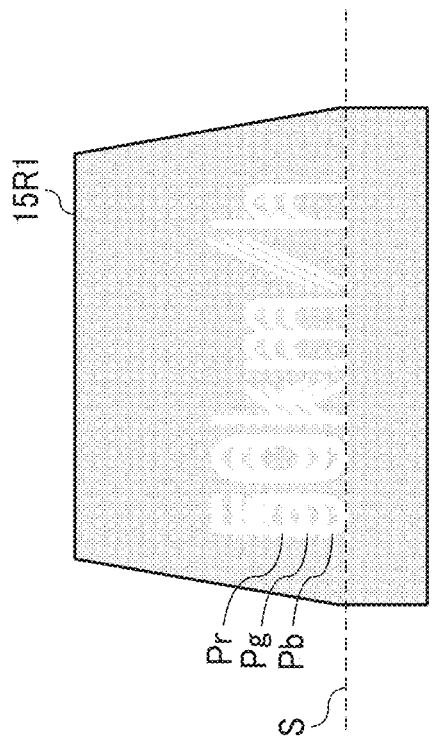

The following describes the difference in display image due to the difference between formulae for calculating the amount of change in the image position to be used for the correction process, using FIG. 25. FIG. 25 is an illustration of a display image in which the text "50 km/h" is displayed at the sub-scanning position of the virtual reference line S within the display image area 15R1. FIG. 25A is an illustration of the result of the adjustment of the image position by using formula (4) that includes parameter K, and FIG. 25B is an illustration of the result of the adjustment of the image position using formula (5) that does not include K.

In the display image of FIG. 25A, a display image Pb formed by the blue light source is displayed closest to the reference line S, and the display position of a display image Pr formed by the red light source and the display position of a display image Pg formed by the green light source are different from the position of the display image Pb. That is, the display image in FIG. 25A is an image in which colors are shifted from each other (a color-shift image).

Such a color-shift image might be generated by an error in calculation due to the parameter K included in formula (4). That is, when ambient light occurs and a signal noise is included in the light signal from the light detection sensor 60 during detection of scanning light emitted from a light source of a certain color, an error might occur in the number of scanning lines detected based on the light signal. For example, in the case where 21 scanning lines are erroneously detected although the actual number of scanning lines is 20, if the amount of change in the image position using formula (4), this erroneous difference by one line is multiplied by K, and accordingly the image position needs to be corrected by K scanning lines.

As described above, when a detection error occurs due to, for example, ambient light, by performing the correction using formula (4) that includes parameter K, a color shift image that can be recognized by a person might be generated. FIG. 25A indicates the case where the positions of the images formed by the light beams emitted from the light sources of three colors are shifted from each other. For example, when a detection error occurs for one of a plurality of light sources, a color shift occurs only in the image formed by the light from the one light source.

By contrast, in FIG. 25B, the position of the image display is shifted upward in the sub-scanning direction with respect to the reference line S. The display images Pr, Pg, and Pb formed by the light beams from the respective light sources are displayed at the same position.

Since formula (4) is not used for the display image in FIG. 25B, the calculation of the amount of change in the image position is influenced by the amount of change in image size. That is, even if the number of scanning lines actually increases or decreases due to an increase or decrease in the image size, the image position correction is executed as a change in the image position. However, even if the image position is corrected based on such an amount of change influenced by the amount of change in the image size, the positions of the images of three colors are moved (changed) together, and a color shift is less likely to occur. In addition, in the case of FIG. 25B, a color shift due to the erroneous calculation of parameter K as in FIG. 25A is less likely to occur because formula (4) is not used.

That is, the cases of FIG. 25A and FIG. 25B differ from each other in that in FIG. 25A, a color shift occurs although the amount of change in the image position is accurately calculated with an elimination of the amount of change in the image size whereas in FIG. 25B, no color shift occurs although the calculated amount of change in the image position is an amount of change in position influenced by the change in the image size as compared to the actual amount of change in position. Accordingly, in consideration of this difference, any desired formula may be selected according to the case. For example, as a human recognition characteristic, the color shift is more likely to be recognized by person than the shift in the image position does. Accordingly, an image in which the color shift is reduced as illustrated in FIG. 25B is more prioritized, it is desirable to use formula (5) or formula (6) rather than formula (4).

The method using formula (5) or formula (6) may be used in the configuration in which two light receivers are disposed substantially diagonally as illustrated in FIG. 13.

Figure 26:
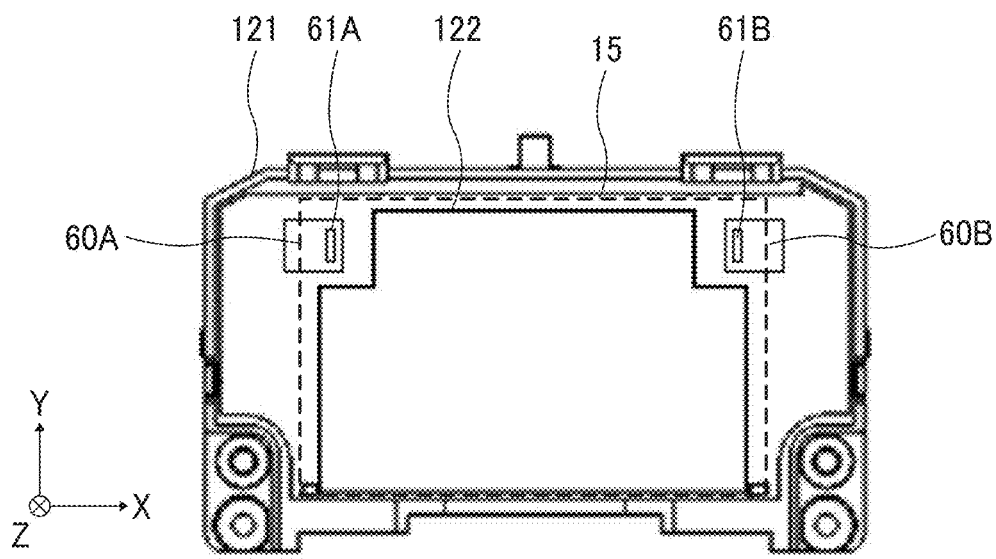
FIG. 26 is a front view of a holder of a screen.
Figure 27:
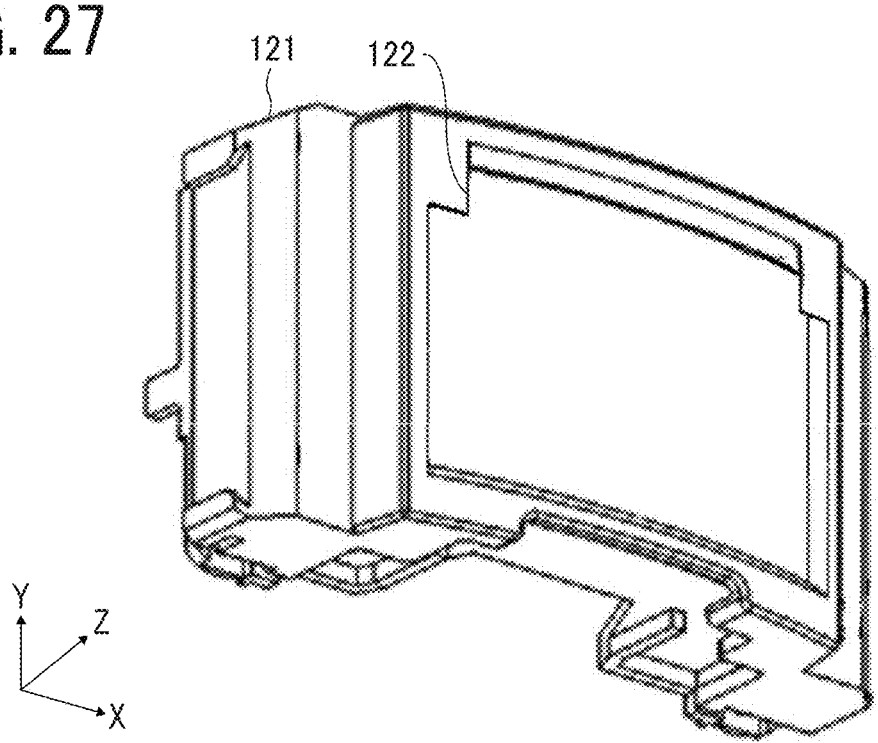
FIG. 27 is a perspective view of a holder of the screen.

FIGS. 26 and 27 are illustrations of an example of a screen holder. FIG. 26 is a plan view of a holder 121 as a part of the unit housing 12, and FIG. 27 is a perspective view as seen from the opposite side of FIG. 26.

As illustrated in FIG. 26, the holder 121 is a holder for holding the screen 15 indicated by the dotted line. The light detection sensors 60A and 60B are provided in a part of the holder. The light detection sensors 60A and 60B includes light receivers 61A and 61B, and the light receivers 61A and 61B are provided at positions of the detection images G1 and G2. In FIG. 27, scanning light is emitted through an opening 122 in a direction from the rear side to the front side of the drawing sheet in which FIG. 27 is drawn. Thus, the shape of the display image area 15R1 is determined according to, for example, the shape of the opening 122.

FIGS. 28A and 28B are illustrations of a configuration for correcting an image according to a third embodiment. In the first embodiment and the second embodiment, two light receivers are provided such that the first illuminated area is provided for one light receiver, and the second illuminated area is provided for the other light receiver. In the third embodiment, only one light receiver 61 is provided such that either one of the first illuminated area and the second illuminated area is selected to be illuminated for each scanning, and an image adjustment control is performed using the detection result of each illumination.

FIG. 28A indicates a first illuminated area including the lower end of the light receiver in the sub-scanning direction in N frame, and FIG. 28B indicates a second illuminated area including the upper end of the light receiver in the N+1 frame. With this configuration, at least any one of the light receiver 61 performs an image correction, and a larger display image is obtained with a larger two-dimensional scanning area 15R3.

Note that the configuration that temporally switches between the first illuminated area and the second illuminated area illuminating of the second illumination area to be illuminated can be used in the first embodiment and the second embodiment. In the image display device having the configuration of the embodiment of the present disclosure, light other than the light for projecting a display image might unintentionally leak to the display image area 15R1 due to scattering of light on a mirror surface of the mirror 130. Accordingly, the viewer 3 might visually recognize unwanted light. Temporally switching between the first illuminated area and the second illuminated area to be illuminated eliminates lighting other than the lighting of image information in one frame, and substantially prevents the unintentional leakage of light. Thus, an image with good visibility can be displayed.

As an example, a scan frame image may be scanned for one cycle from an image for one screen included in the image information. Alternatively, a scan frame image n and a scan frame image n+1 may be formed from an image for one screen.

Figure 29:
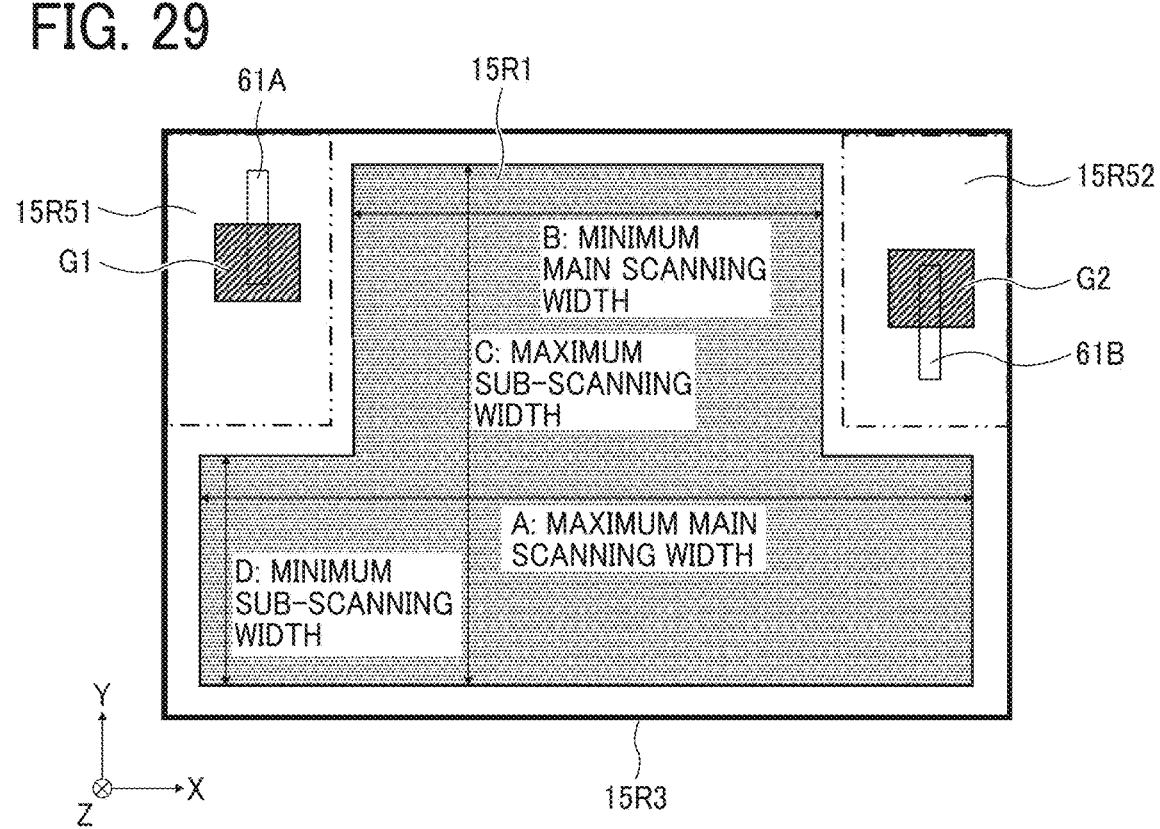
FIG. 29 is an illustration of a display image area according to the first embodiment.
Figure 30:
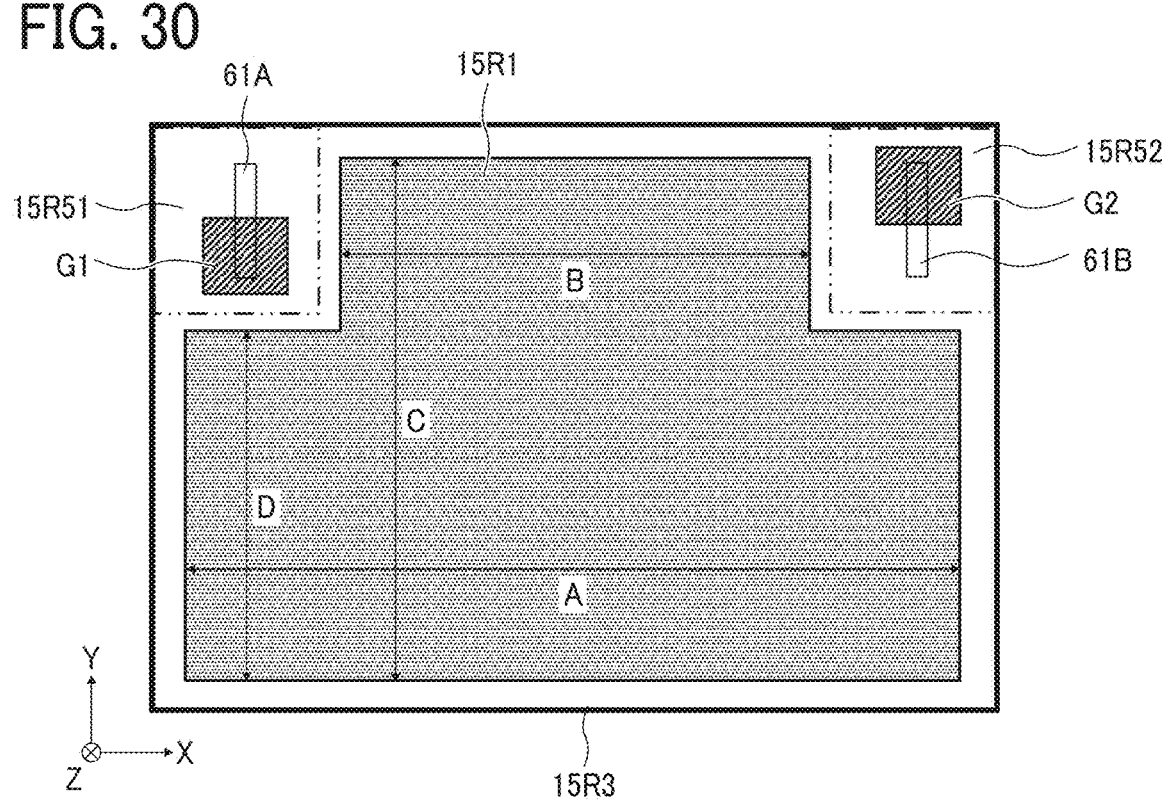
FIG. 30 is an illustration of a display image area according to the second embodiment.
Figures 31, 32:
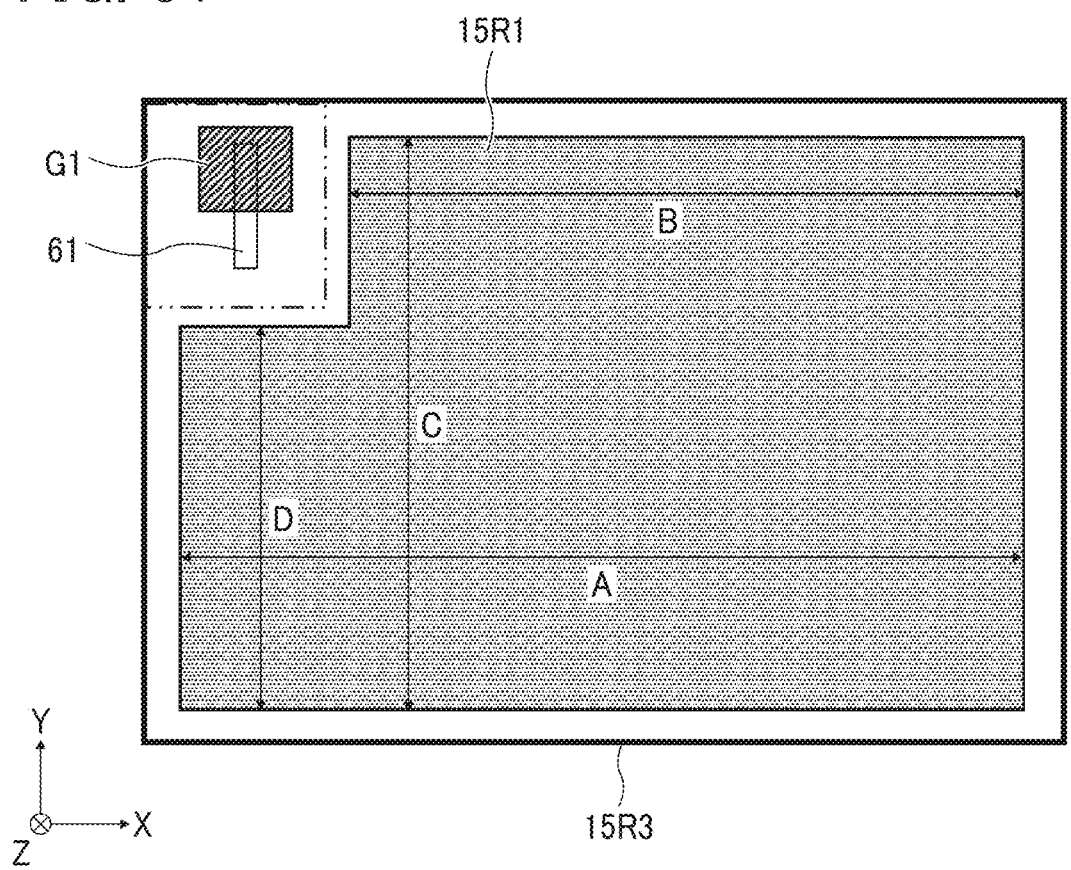
FIG. 31 is an illustration of a display image area according to a still another embodiment.
FIG. 32 is a table for comparing the display image areas according to the first to third embodiments.

FIGS. 29 to 31 are illustrations for comparing the sizes of the display image areas according to the first to third embodiments.

FIGS. 29, 30, and 31 indicate maximum display image areas according to the arrangement of the light receiver 61 of different embodiments. For example, FIGS. 13 and 29 indicates the same configurations of the light receivers 61A and 61B, and the detection image areas G1 and G2, and differ in that the display image area 15R1 in FIG. 13 as a whole is disposed between the light receivers 61A and 61B in the main scanning direction. By contrast, the display image area in FIG. 29, the maximum main scanning width of the display image area 15R1 ranges from the position of the light receiver 61A to the position of the light receiver 61B. That is, in the configuration of the first embodiment, the display image area 15R1 may have the maximum size as illustrated in FIG. 29, and may also be smaller than that in FIG. 29 as illustrated in FIG. 14.

FIG. 32 is a table comparing the sizes of the display image areas 15R1 according to the first to third embodiments. The comparison of the image sizes is normalized so that each dimension width of the first embodiment is one time, and the minimum sub-scanning width can be expanded to 1.5 times larger by using that of the second embodiment. Further, by using that of the third embodiment, the minimum main scanning width can be expanded to 1.3 times larger. In the present disclosure, the two-dimensional scanning area 15R3 has the same size in any of the embodiments. As described above, the light receiver 61 and the detection image area G may be selected as appropriate depending on the desired accuracy of the image adjustment and the desired size of the display image area 15R1.

In the first and second embodiments, each pair of the light receivers 61A and 61B and the detection image areas G1 and G2 are disposed across the display image area 15R1 in the main scanning direction. However, no limitation is intended thereby. Each pair may be disposed on the same side with respect to the display image area 15R1 in the main scanning direction.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

The invention claimed is:

1. A display device comprising:
   a light source;
   a light deflector configured to deflect light emitted from the light source to scan as scanning light in a main scanning direction and a sub-scanning direction;
   a screen having a scanning area to be two-dimensionally scanned with the scanning light at a predetermined cycle, the scanning area having a first area and a second area that differs in position in the sub-scanning direction;
   a light receiver disposed on the screen, configured to detect the light scanning in each of the first area and the second area of the screen; and
   circuitry configured to adjust a position of the scanning light in the scanning area according to the number of scanning lines in each of the first area and the second area, the scanning lines being a trajectory of the scanning light detected by the light receiver in the main scanning direction.

2. The display device according to claim 1,
   wherein the light receiver includes a first light receiver configured to detect the scanning light scanning the first area and a second light receiver configured to detect the scanning light scanning the second area.

3. The display device according to claim 2,
   wherein the position of the first receiver is the same as the position of the second receiver in the sub-scanning direction.

4. The display device according to claim 2,
   wherein the first receiver and the second receiver have the same shape and oriented in the same direction within the scanning area.

5. The display device according to claim 2,
   wherein the first area includes an end of the first light receiver in the sub-scanning direction and the second area includes an end of the second light receiver, the end of the first receiver being closer to a scanning starting side in the sub-scanning direction than the other end of the first receiver and the end of the second light receiver being farther from the scanning starting side in the sub-scanning direction than the other end of the second receiver, wherein the circuitry is configured to:

calculate a sum of an amount of change in the number of scanning lines in the first area from a predetermined number of scanning lines in the first area and an amount of change in the number of scanning lines in the second area from a predetermined number of scanning lines in the second area; and change a size of an image formed in the scanning area in the sub-scanning direction such that the sum of the amount of change in the number of scanning lines of the first area and the second area remains at a constant value.

6. The display device according to claim 2, wherein the first area includes an end of the first light receiver in the sub-scanning direction and the second area includes an end of the second light receiver, the end of the first receiver being closer to or farther from a scanning starting side in the sub-scanning direction than the other end of the first receiver and the end of the second light receiver being at the same side of the end of the first receiver included in the first area, wherein the circuitry is configured to:

calculate a difference between an amount of change in the number of scanning lines in the first area from a predetermined number of scanning lines in the first area and an amount of change in the number of scanning lines in the second area from a predetermined number of scanning lines in the second area; and change a size of an image formed in the scanning area in the sub-scanning direction such that the difference in the amount of change in the number of scanning lines between the first area and the second area remains at a constant value.

7. A display system comprising:

the display device according to claim 1; and a reflector configured to reflect the diverging light diverged by the divergent part.

8. A mobile object comprising the display system according to claim 7, wherein the reflector is a windshield configured to reflect the diverging light.

9. The display device according to claim 1, wherein the circuitry is configured to change the position of an image formed in the scanning area in the sub-scanning direction.

10. The display device according to claim 1, wherein the circuitry is configured to change the size of an image formed in the scanning area in the sub-scanning direction.

11. The display device according to claim 1, wherein each of the first area and the second area includes either one of ends of the light receiver in the sub-scanning direction.

12. The display device according to claim 1, wherein the scanning area includes a display image area in which a display image is formed, wherein the first area and the second area are not included in the display image area.

13. The display device according to claim 1, wherein the light receiver is one light receiver.

14. The display device according to claim 1, wherein the circuitry is configured to switch between the first area and the second area to which the light source emits light, when the deflector scans the scanning light for each predetermined cycle.

15. The display device according to claim 1, wherein the circuitry is configured to:

calculate an amount of change in the number of scanning lines in the first area from a predetermined number of scanning lines in the first area and an amount of change in the number of scanning lines in the second area from a predetermined number of scanning lines in the second area;

multiply the amount of change in the number of scanning lines in the first area by a parameter according to a position of one end of the light receiver included in the first area in the sub-scanning direction and the amount of change in the number of scanning lines in the second area by a parameter according to a position of the other end of the light receiver included in the second area in the sub-scanning direction; and change an image forming position in the sub-scanning direction based on the multiplied values for the first area and the second area.

16. The display device according to claim 1, wherein based on the amount of change in scanning lines received in the first area or the second area, the circuitry is configured to control an image forming position in the sub-scanning direction.

17. A display device comprising:

a light source;

a light deflector configured to deflect light emitted from the light source to scan as scanning light in a main scanning direction and a sub-scanning direction;

a screen to be scanned with the scanning light, the screen having a scanning area to be two-dimensionally scanned with the scanning light at a predetermined cycle, the scanning area having a first area and a second area that contain positions different in the sub-scanning direction;

a light receiver disposed on the screen, configured to detect the light scanning each of the first area and the second area of the screen; and circuitry configured to adjust a position of the scanning light in the scanning area according to the number of light signals output from the light receiver during a time to scan the first area and the number of light signals output from the light receiver during a time to scan the second area.

18. The display device according to any one of claim 1-2 or 3-17, further comprising an imaging optical system, wherein the screen is a divergent part to diverge as the scanning light that has scanned the screen, wherein the imaging optical system is configured to project diverging light diverged by the divergent part to form a virtual image of the image to be visually recognized by a viewer.

19. A display control method comprising:

deflecting light emitted from the light source to scan as scanning light in a main scanning direction and a sub-scanning direction;

detecting the light scanning a scanning area of a screen to be scanned with the scanning light, the scanning area having a first area and a second area that contains positions different in the sub-scanning direction;

detecting the number of scanning lines in each of the first area and the second area by a light receiver disposed on the screen, which are a trajectory of the scanning light detected by the light receiver in the main scanning direction; and adjusting a position of the scanning light in the scanning area in the sub-scanning direction according to the number of scanning lines detected in the detecting.

20. A non-transitory recording medium for controlling a computer system to carry out the method according to claim 19.

* * * * *